(12) United States Patent
Falchuk et al.

(10) Patent No.: US 8,280,378 B2
(45) Date of Patent: Oct. 2, 2012

(54) METHOD AND SYSTEM TO SUPPORT USER-CENTRIC SELECTION OF POINT OF ATTACHMENT THROUGH MOMENTARY INTERACTIVE MULTIMEDIA EXPERIENCE CONVEYANCE AND THROUGH CORRELATION OF WEB LINKS TO QUALITY AND EXPERIENCE METRICS

(75) Inventors: Benjamin Falchuk, Uppery Nyack, NY (US); David Famolari, Stewartsville, NJ (US)

(73) Assignees: Telcordia Technologies, Inc., Piscataway, NJ (US); Kabushiki Kaisha Toshiba, Tokyo (JP)

(*) Notice: Subject to any disclaimer, the term of this patent is extended or adjusted under 35 U.S.C. 154(b) by 100 days.

(21) Appl. No.: 13/015,541

(22) Filed: Jan. 27, 2011

(65) Prior Publication Data
US 2012/0028643 A1 Feb. 2, 2012

Related U.S. Application Data

(60) Provisional application No. 61/311,596, filed on Mar. 8, 2010.

(51) Int. Cl.
*H04W 4/00* (2009.01)
*H04W 36/36* (2009.01)
(52) U.S. Cl. .................. 455/436; 455/422.1
(58) Field of Classification Search ............ 455/452.2, 455/442, 525, 437, 515, 436, 422.1, 426.1, 455/569.1, 552, 418, 405–408, 554.1, 461, 553.1, 428, 450; 379/114.02, 121.02, 221.01, 379/221.02, 114.01, 114.06, 220.01, 115.01, 379/265.1; 370/356, 328, 329, 235, 330, 370/230.1; 709/238
See application file for complete search history.

(56) References Cited

U.S. PATENT DOCUMENTS

| 6,671,359 B1 | 12/2003 | Enzmann et al. |
| 2006/0221858 A1 | 10/2006 | Switzer et al. |
| 2007/0168553 A1 | 7/2007 | Jones et al. |

*Primary Examiner* — Melody Mehrpour
(74) *Attorney, Agent, or Firm* — Philip J. Feig

(57) ABSTRACT

A system and method for improving quality of experience (QoE) of using a mobile device can comprise utilization of stored information relating to RANs of service providers and QoE ratings, receiving an event related to the RANs or to mobile Web browsing actions, receiving requests for QoE metrics based on the event, parsing and interpreting results of the QoE metrics; preparing and beginning an emulation session of the RANs, choosing a presentation style, rendering QoE in accordance with the browser actions and the presentation style which can be purely quantitative comparison, pre-recorded session, limited interaction-emulated session, live interactive session and live automatically controlled non-interactive session, and enabling user input according to the presentation style. The method can comprise standardizing information to allow comparison of the information, rendering network-related information on a display and updating the presentation of the network-related information to maintain a fair representation of the RANs being emulated.

24 Claims, 25 Drawing Sheets

Main Flow: Analyze After Web Click

Parse, read, and "Score" the page (as well as "next-hop" pages...

The page is analyzed before presentation... A popup dialog:

Then, attach to appropriate RAN that meets the scoring of the page...

Then, the next page streams over the newly attached RAN...

attached

RANs

Main Flow: Hover flow

2. System analyzes linked page, compares it to current page, scores it, and creates a dialog if there are RAN's that score better at serving This page to user. A hover dialog appears:

1. User hovers over mobile link

3. System may attach to a candidate RAN and continue on to the hovered link. Or with no action the hover interface disappers (on mouseff)

METHOD AND SYSTEM TO SUPPORT USER-CENTRIC SELECTION OF POINT OF ATTACHMENT THROUGH MOMENTARY INTERACTIVE MULTIMEDIA EXPERIENCE CONVEYANCE AND THROUGH CORRELATION OF WEB LINKS TO QUALITY AND EXPERIENCE METRICS

CROSS REFERENCE TO RELATED APPLICATIONS

This application is related to and claims priority to U.S. Provisional Application Ser. No. 61/311,596 filed on Mar. 8, 2010, the entire contents and disclosure of which is incorporated herein by reference.

FIELD OF THE INVENTION

This invention relates to mobile devices, 4G networks and utilization, and mobile user Quality of Experience (QoE).

BACKGROUND OF THE INVENTION

Mobile users will have more connectivity options as the availability of multiple networking technologies increases. Each connectivity option may affect service quality in unique ways depending on a multitude of factors. At present, users have few ways to accurately and quickly experience expected service quality on a given network before they make their network selection. Users therefore must either rely on operator promises, available metrics of performance pre-selection, such as signal strength, or employ a trial-and-error approach. The latter is time-wasting while the former often confuses naïve users with network engineering terms that they do not fully understand.

Mobile users have more and more options for services. They already manually choose between information services that offer similar value, e.g. mobile web-sites, mobile applications. Today's 4G-5G landscape means that in many areas, especially highly populated ones, there will be a heterogeneous mix of access networks, e.g. WiFi, CDMA, GSM, WiMAX, etc., visible to a mobile device at any time. User devices are capable of, and involved in, complex signaling and connectivity (transparently to user) messaging, e.g., reading Base Station signal strength, handing over between Base Stations (see IP Multimedia Subsystem (IMS), 3GPP, standards, etc.)

In a contract-less world where networks may be used on-the-fly and for short times, choice and mobile user experience become more important to the user as a differentiator. The ability to attach to radio access networks (RANs) in contract-less fashion is becoming real, e.g., contract-less Mobile Virtual Network Operators (MVNOs) such as Zer01.

When multiple links (so-called Layer 2, or L2) and networks (so-called Layer 3 or L3) connectivity services, such as those that supply the mobile device with an IP address and access to the Internet or some other data network, are available to mobile users, a decision must be made to choose one over another. Policy functions are effective in cases where quantitative metrics are the basis for decision and these metrics are available directly. Policy Decision Point (PDP) and/or Policy Enforcement Point (PEP) components effectively implement policy functions which result in a decision being made about something (e.g., an available network) based on some available criterion (e.g., cost of network access). However, in cases where softer experiential or qualitative metrics are important, it is harder to anticipate and convey the impact of a network selection to a user whose mindset is not machine-readable. With the standard PDP choice, the system cannot take into account the quality of experience of using the system, or the nearly impossible-to-quantify emotional aspects of the user which should drive the decision, such as the user's mood, his level of trust of particular options, the urgency of his requirements, the user's future schedule of network needs, and so on. The user herself, however, has an intuitive understanding of all of the these.

While in today's current environment users can choose some aspects of their experience, they cannot choose others (sometimes for good reason). Most of the time, mobile devices make automatic choices (e.g., that strive to optimize performance) without the user in the loop. This works well for decisions made on the basis of complex network engineering aspects that users do not understand, such as bit rates, loss, jitter, and so on. On the other hand, Quality of Experience (QoE), the subjective measure of performance in a system, is of rising importance in all user services industries, including Web and mobile. In general, users may want a say in how options (usually selected beyond their control) are selected, e.g., networks used, etc., in order to optimize their subsequent experiences with the services. Operators and service providers may prefer that some choices (and ramifications) are left to the customer rather than their computing platform or PDP/PEP (e.g., they may have liability). Pushing choice up to the user is empowering to the user, who understands QoE in an intuitive way ("I know good QoE when I see it!"). Yet no tools exist that employ interactive QoE evaluation at the moment when L2/L3 attachment is possible.

Because multi-networks and multi-mode devices are relatively new, multimedia computing capabilities are only recently at a sufficiently high level, and contract-less network attachments are relatively new, there has been little work specifically addressing user selection of point of attachment guided by interactive QoE measurements and QoE-based suggestions. New demands of mobile users, device capabilities, and network proliferation are only presently generating the need for these capabilities.

Existing systems have successfully used policy to analyze quantitative metrics of networks in order to choose the most appropriate one at a given moment. These metrics may include those related to quality of service (QoS), e.g. jitter, delay, etc., or any other quantifiable metrics. The industry groups 3GPP (Third Generation Partnership Program) and OMA (Open Mobile Alliance) have documents describing this. Existing systems, however, have not addressed how the QoE across several networks can be interactively presented to a mobile user in the form of emulations, or other visual means, nor how the user's use of Web browsing applications can be supported by real-time network and link level intelligence to increase user experience.

In the current art, Quality of Service (QoS) can be conveyed via low level metrics such as signal strength or bit rate. For QoE, however, these are very coarse indicators and end users do not understand the relationship between these indicators and QoE. Mobile operators already provide QoS-based Service Level Agreements (SLAs) between themselves and MVNOs and others paying to lease or use their networks, and so a variety of techniques exist to measure and test QoS. Network monitoring and surveillance products can monitor links in a communications network and can emit alerts when link performance might threaten prescribed QoS. There are many such QoS-related products. In practice, some techniques also exist to measure and test QoE for mobile devices. Such techniques can include end to end monitoring, probes, and/or on-device software and human testers. Principally however, the user is involved in QoE measurement as QoE is—at least in part—a subjective measure of quality made by a given user.

Further, today's mobile devices almost all have Web browsers and have the capability to access information from the Internet. Today's browsers include Internet Explorer®, Opera®, Firefox®, Safari®, and others; different versions of these exist for different platforms (e.g., for mobile devices with a particular OS). These Web browsers implement the Hypertext Transfer Protocol (HTTP) protocol and support (to some extent) the HTML standards as defined by W3C. Notably, an HTML page can be viewed by a Web browser and contains embedded links, multimedia and data. The links on a give page are activated when a user selects them (e.g., with a mouse pointer or gestural motion), and cause the browser to load the resources pointed to by the link. On today's sometimes loaded mobile networks, it can be frustrating for users browsing the Web on these devices to access information. A common use case is a mobile user clicking on a link that leads to data-intensive content (e.g., video streaming) even though the network he is currently attached to is not truly optimal to support such content. Another current problem is that today's systems do not anticipate the linked content that a user will choose, nor do they correlate the properties of that linked content to network capabilities to offer suggestions for improved QoE on given linked content.

Further, the notion of "ranking" Web pages for importance or authority is well studied. It is embodied, for example, in Google's PageRank®. Ranking algorithms may be highly proprietary or use best-practices or known algorithms. A fundamental algorithm for ranking a Web page's so-called importance is to count the number of other pages that make reference to it in links and use that as a rank. Measuring and estimating Web performance is also part of the current art. This includes techniques for estimating a Web page load time based on its size, composition, e.g. web sites offering optimization, and so on.

Web Content preview (window-in-window) via, for example, the CoolPreviews® (by CoolIris inc.) tool allows a Web browser user to "preview" the contents of a page's link by hovering over it with the pointing device. Google® also uses this approach on search results pages. This can be useful for users to decide if the linked-to page merits browsing. Upon hover the Web browser loads the link contents (or a portion) and renders it in a small window for preview. Users find this useful because the parent window remains visible and the previewed window is layered over top of the parent window and can be moved or closed easily yet it previews the link the user would arrive at if selected.

The field of content adaptation aims to adapt Web content so that it is suitable for the mobile device it is viewed upon. This field focuses mostly on the salient issues of the mobile device screen size and page navigation modes and adapting Web pages and Web page elements (e.g., images, audio) to that device. High level approaches to content adaptation include making a device specific version available, adapting content on the fly between the server and client, and using learning approaches and feedback to better understand what adaptation is best for the user.

Hierarchical coding, e.g. of video, is a technique in which media are coded in a manner that allows different qualities to be played out at the discretion of the decoder. This allows, for example, a low resolution version of video to play in resource constrained situations, and a high-resolution one in contexts where network resources are highly available.

Prior solutions to content adaptation have not attempted to take into account the dynamic nature of the surrounding radio access networks (RANs): both the presence of and capabilities of RANs are unpredictable, and content cannot be tailored a priori for it. Optimization techniques are useful in isolation but do not provide an analysis->user-interaction->link-utilization process that is necessary to give mobile users the option for improved quality of experience as a function of anticipated Web content. Prior solutions have not tied mobile Web browsing actions to link characteristics and user experience via dialogs. Existing content adaptation techniques do not address the Link and Radio attachment points.

There is a need for experiential techniques that improve network selection and give mobile users a richer, more relevant and impactful estimate of expected service quality.

SUMMARY OF THE INVENTION

The inventive system and method provides user-centric, experiential network-selection tools based on interactive or emulated usage of multiple networking options. User-centric (or "user-in-the-loop") implies that the user is necessarily directly involved in the process. This inventive technology includes experiential techniques that allow mobile users to experience either live (e.g. reading bits from a server over a wireless network) or emulated application experiences, and to receive recommendations based on their moment to moment use of Web browsing tools. Using these novel tools and techniques, mobile users can make more informed network selection decisions, based at least partially upon their own subjective terms.

The solution supports a new style of network selection in which a user can interact with live or emulated networking options—either in series or in parallel—to gain insight into the service quality experience offered by available networking options. This style of network selection leverages the "I know it when I see it" model of purchasing and gives users insight regarding their available options that is more accurate, relevant and meaningful to their service experience.

Functionally, prior solutions do not use an emulation or network attachment subsystem in combination with a GUI functionality that presents relevant information on the mobile device screen. Most prior art has rendering functionality that simply lists a set of candidate networks along with optional metrics regarding those networks (e.g., cost, bandwidth). Prior solutions are not able to manage the presentation of emulations that correspond to the candidate RANs. Prior solutions do not use the novel rendering architecture nor visualization of the present invention.

In a contract-less world, Wireless Network Operators and MVNOs would like to attract customers to use their networks. Customers, typically tied to a single carrier, have no way to choose between available connectivity services, and even if they did, there is no non-trivial tool or method to provide these options or selections to the customer. The present invention allows us to build a compelling and effective application that makes connectivity options highly graphical, visible, and interactive through a series of momentary (either real or emulated) sessions on the networks in question. Since QoE is subjective and users intuitively know when an experience is good, our invention supports a very subjective and personalized evaluation and will serve as a valuable new tool for the end user.

Web browsing is a quintessential operation performed on almost all mobile devices. New tools that allow mobile devices to better match specific web browsing tasks with available network resources are presented. In one embodiment, our invention proactively evaluates anticipated web requests and matches the service requirements of those requests to the prevailing performance characteristics of available Radio Access Networks (RAN). This enables a new form of mobile web browsing where individual web resources can be delivered over separate access networks to provide a much improved user experience. Further, the invention creates a unique approach to quantifying web resource service requirements and network performance characteristics, allowing developers and network operators to quickly discover and match service requests to the most appropriate access networks.

In one embodiment, the invention provides experience-improving network-aware notifications and suggested actions to users of Web browsing tools. The notifications and actions, seamlessly integrated with Web browsing software, comprise an automated way to provide user awareness of how associations to particular RANs may improve the users experience on the mobile Web for the currently viewed Web page or pages that are reachable from the currently viewed Web page. Notifications and actions may be in response to user browsing events, such as particular mouse movements or selections captured by the browsing tool.

A system for improving quality-of-experience of using a mobile device is presented. The system can comprise a CPU in the mobile device, a selector manager on the mobile device, the selection manager receiving events relating to RANs of one or more service providers, a UI manager operable to render the quality-of-experience of one or more of the RANs in accordance with a chosen presentation style, a network quality and traffic data server storing information relating the service providers and quality-of-experience ratings, a quality interpreter receiving requests for quality-of-experience metrics from the network quality and traffic data server and parsing and interpreting results of the quality-of-experience metrics to obtain the rendered quality of experience, and a state providing data shared between one or more of the selection manager, the UI manager, the network quality and traffic data server, and the quality interpreter, wherein the chosen presentation style is one of purely quantitative comparison, pre-recorded session, limited interaction-emulated session, live interactive session, and live automatically controlled non-interactive session, and user input occurs in accordance with the presentation style.

In one aspect, the UI manager renders the quality-of-experience in either tabbed pane window mode, or simultaneously visible virtual windows mode.

In another aspect, a system for improving quality-of-experience of using a mobile device, comprises a CPU in the mobile device, a web browser connector, a module operable to track Web browser actions made by a user and to examine and score Web pages and quality measures of nearby wireless networks and to suggest a network as best of the nearby wireless networks based on the Web browser actions, a dialog manager interacting with the user via dialogs on the mobile device and capturing input from the mobile device, a preference manager storing user preferences for wireless networks as related to Web content, and a handover function triggering or executing network handover on demand. In one aspect, the module is further operable to catch a subset of Web browser actions as they happen and pause content loading, to examine current and future Web content of interest to the user, to determine the best nearby wireless network at a given time, to engage the user in a dialog about options regarding the best nearby wireless network, to trigger the network handover, and to proceed to a desired Web resource.

A method for improving quality of experience (QoE) of using a mobile device is also presented. The method can comprise storing information relating to RANs of one or more service providers and quality-of-experience ratings, receiving, on a mobile device, an event from the RANs of the one of the service providers, receiving requests for quality-of-experience metrics based on the event, parsing and interpreting results of the quality-of-experience metrics to obtain the quality-of-experience, preparing, using a CPU, and beginning an emulation session of one or more of the RANs, choosing a presentation style, rendering the quality-of-experience in accordance with the chosen presentation style, wherein the chosen presentation style is one of purely quantitative comparison, pre-recorded session, limited interaction-emulated session, live interactive session and live automatically controlled non-interactive session, and enabling user input in accordance with the presentation style.

In one aspect, the method further comprises standardizing information to allow comparison of the information, rendering network-related information on a display of the mobile device, and updating the presentation of the network-related information to maintain a fair representation of the one or more RANs being emulated. In one aspect, the method further comprises performing system check both before and during rendering to ensure fair and efficient rendering, rendering an initial view into an active area on the mobile device, beginning rendering non-initial views in response to "play/start" button, toggling between tabs and virtual windows views in the active area, and interacting with toolbar buttons.

In one aspect, the method further comprises performing system check both before and during rendering to ensure fair and efficient rendering, allowing pre-provisioned interaction, stopping activity, prompting user for decision, and disconnecting Media Independent Handover. In one aspect, the method further comprises performing system check both before and during rendering to ensure fair and efficient rendering, allocating one or more of the RANs to network adapters in the mobile device, attaching the one or more of the RANs to the network and synchronizing when all RANs are connected, when initialization of 'play/start' is received: rendering appropriate media on each active area, parsing a script having one or more next steps describing a rendering of network quality, performing one or more of the next steps in the script, stopping activity, and prompting user for decision. In one aspect, the method further comprises notifying user of constraints, and ending in accordance with the constraints. In one aspect, the method further comprises performing system check both before and during rendering to ensure fair and efficient rendering, allocating one or more RANs to network adapters in the mobile device, attaching the one or more RANs to the network and synchronizing when all RANs are connected, when initialization of 'play/start' is received: rendering appropriate media on each active area, allowing interaction and emulating interaction on all active areas, stopping activity, and prompting user for decision. In one aspect, the method further comprises notifying user of constraints, and ending in accordance with the constraints. In one aspect, the method further comprises directing user attention to correct aspect.

In another aspect, a method for improving quality-of-experience of using a mobile device comprises catching, using a CPU in the mobile device, Web browser actions made by a user, examining and scoring Web pages and quality measures of nearby wireless networks and to suggest a network as best of the nearby wireless networks based on the Web browser actions, interacting with the user via dialogs on the mobile device and capturing input from the mobile device, storing user preferences for wireless networks as related to Web content, and triggering or executing network handover on demand.

In one aspect, the method further comprises catching Web browser actions at a low level and pausing content loading, examining current and future Web content of interest to the user, determining the best nearby wireless network at present, engaging the user in a dialog about options regarding the nearby wireless networks, triggering the network handover, and proceeding to a desired Web resource.

A computer readable storage medium storing a program of instructions executable by a machine to perform one or more methods described herein also may be provided.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION

Figure 1:
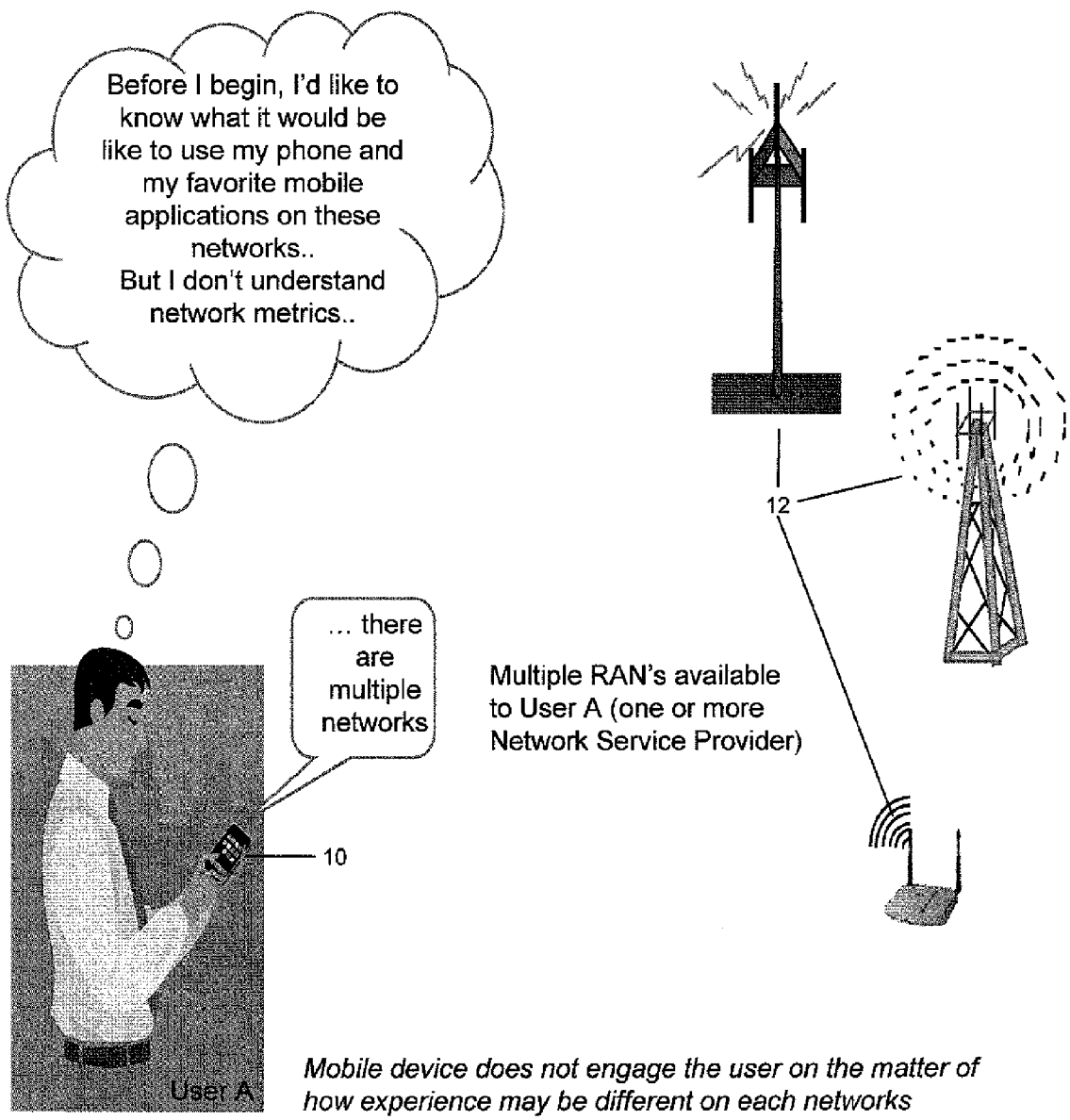
FIG. 1 shows an exemplary motivation and setting for the present invention.

For purposes of the description in this application the following definitions shall apply.

Quality of Experience (QoE): A subjective measure of performance in a system. QoE relies on human opinion and differs from quality of service (QoS), which can be precisely measured. For example, a person's reaction to listening to music through headphones is based not only on the frequency response of the system and the speakers, but the comfort of the unit and the individual's hearing sensitivity.

Mobile Quality of Experience: QoE as related to delivery and consumption of mobile services to users of mobile devices.

Network squatting: the process by which a client connects to a network wirelessly for a relatively short time for the express purpose of experiencing network QoE; the session may be provided as a free service to the user or may be charged as micro-charge. When faced with comparing several RANs currently available to them, squatting is a key way to allow users to compare the networks and choose one to use on a longer term basis. Squatting may involve real connections to RAN's in question or may involve connection-less visual and/or aural emulations of the quality that would otherwise be experienced by connecting to the network.

The invention employs unique signaling and inter-component messaging. In order to manage the presentation of various network connections and emulations, sophisticated component functionality is needed. The interworking with various local and non-local (networked) functions requires careful ordering. The definition of such a system is difficult and visual and aural expressions and renderings of network QoE rendering are novel as defined in the present invention.

An inventive solution, Interactive Quality-of-experience Renderer (INQuiRE), is presented. This solution is a software system with three possible deployment options: 1) residing solely in the mobile device, 2) residing in a server and accessible via mobile device, and 3) a combination of these.

As an example, on the mobile device, the invention or inventive solution may be positioned (in a functional sense) between the IEEE 802.21 "discovery of alternative networks" step and the "handover" step, or the invention may be a client of any analogous discovery or handover function. As another example, on a desktop environment with fixed network access, the invention may provide an offline approach to understand mobile QoE (which would be largely emulated since the user may not be situated near the RANs in question).

Using the invention or inventive solution, the user has the chance to: 1) Choose when to compare the available networks, 2) Choose what kind of application or data she wishes to "Experience" on each network, 3) Choose the visual rendering style of the comparison, 4) Select a network or cancel at any time and remain attached to the current network(s). If multiple networks are in question, squatting can be done in sequence (one network at a time) or in parallel during a short time period in which multiple attachments/connections are made to multiple RAN's and their experiences are shown in parallel (e.g., on a tabbed pane on a graphical interface).

FIG. 1 shows an exemplary motivation and setting for the present invention. As shown in FIG. 1, a user, User A, has a mobile device 10 with a CPU or processor (not shown). This mobile device 10 can detect multiple networks and can recognize that there are multiple RANs 12 available to User A. These multiple RANs 12 can include one or more Network Service Providers. User A may want to use his mobile device, e.g., his mobile phone, to run his favorite mobile applications on various networks, but he may not understand how network metrics will affect quality of experience on these RANs.

The inventive system and method addresses this situation. The system uses, when possible, metadata (which might be real, estimated and/or community-generated) about each RAN to create an emulation. These metadata may include: bit rate, jitter, delay, traffic levels (real/dynamic or profiled), and other well-known metrics. The particular combination of metrics is beyond the scope of the invention; any can be used. Metadata may relate to the RAN 12 currently available to the user.

As an alternative approach, the inventive system can make use of parallel, simultaneous network connections to compare live network performance of two or more RAN candidates. This option is applicable to devices with multiple radios and network interfaces that can be operated simultaneously and that each attach to one of the networks in question and access the QoE multimedia presentation. In this case, visualization and presentation options may be invoked to perform either a side-by-side comparison on the interface of the mobile device 10 appropriately resized and reformatted. Another display option would have candidate RAN "experiences" running in background windows that could be brought forward on demand, resized, and so on. Because QoE presentations are sometimes emulated by the system a device need not have multiple radios to have simultaneous presentation of QoE.

Note that any canonical scheme for reporting available RAN presence and RAN capabilities/metrics can be used in the invention; IEEE 802.21 standard is not mandated but could be used as a starting point.

As an information model for metadata, IEEE 802.21 Media Independent Information Service (MIIS) and Media Independent Handover (MIH) schemata are extensible. Vendor-specific Information Elements (IE) can be defined to describe network level or QoE level metrics that can then be exploited by MIH Function (MIHF) and higher levels. This standard for handover and interoperability between heterogeneous network types defines a way to extend schemas so that custom uses can be defined through schema extensions.

Figure 2:
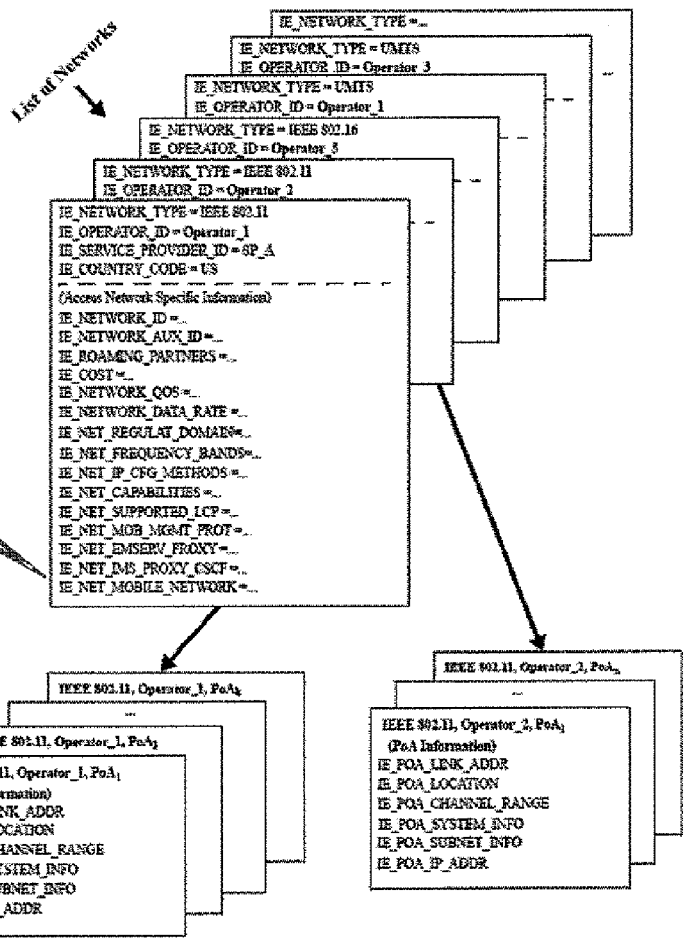
FIG. 2 shows using or extending existing standards and schemata to express QoE information.

FIG. 2 shows using or extending existing standards and schemata to express QoE information.

Figure 3:
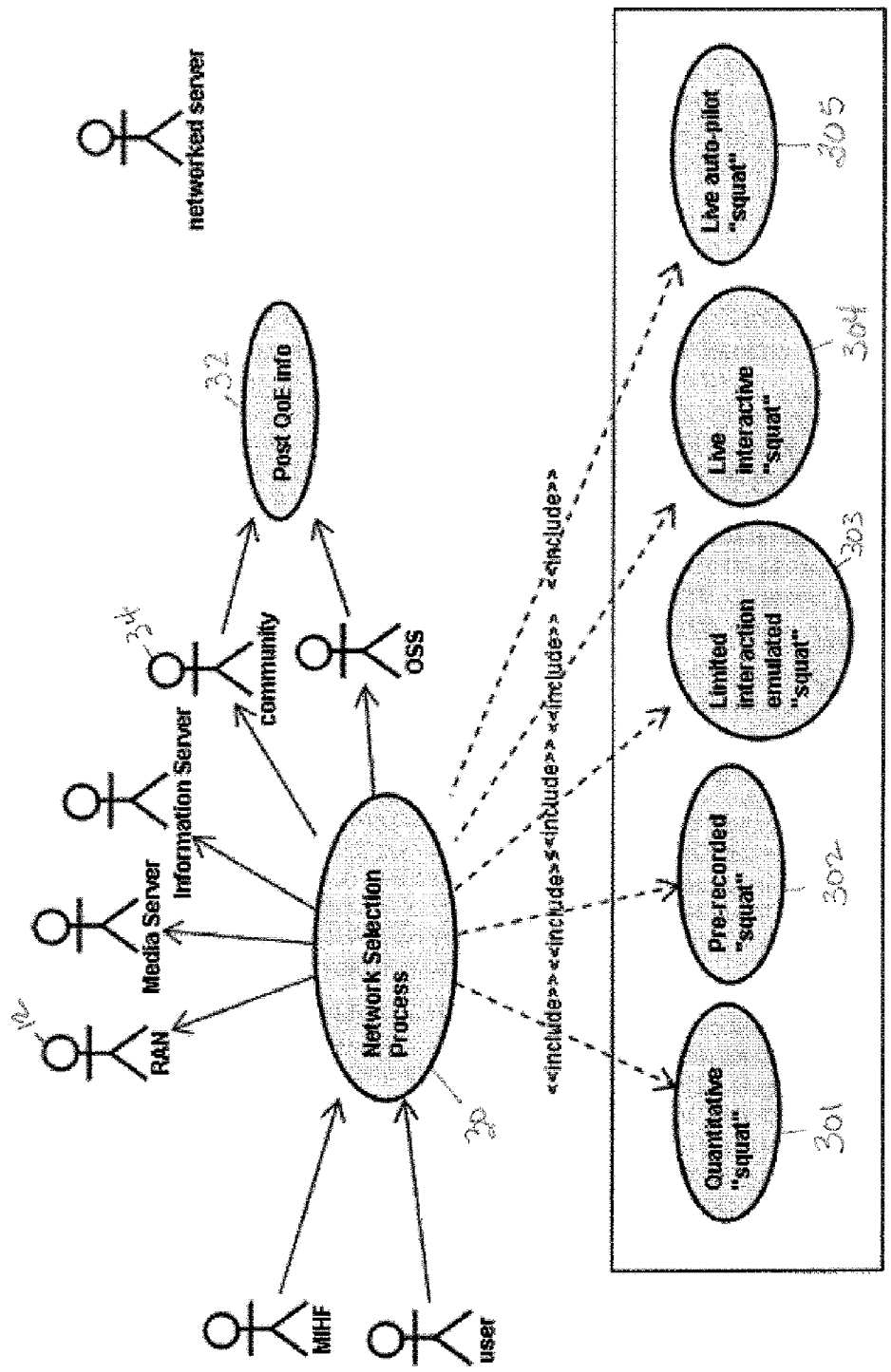
FIG. 3 shows exemplary main cases of the invention.

Some exemplary INQUIRE use cases are depicted in FIG. 3. They are comprised of processing network selection 30 and posting and sharing QoE information 32 where it can be used later. Processing network selection 30 can be comprised of a quantitative squat session 301, a pre-recorded session 302, a limited interaction session 303, a live interaction session 304, and a live automatically-controlled session 305.

Figure 4:
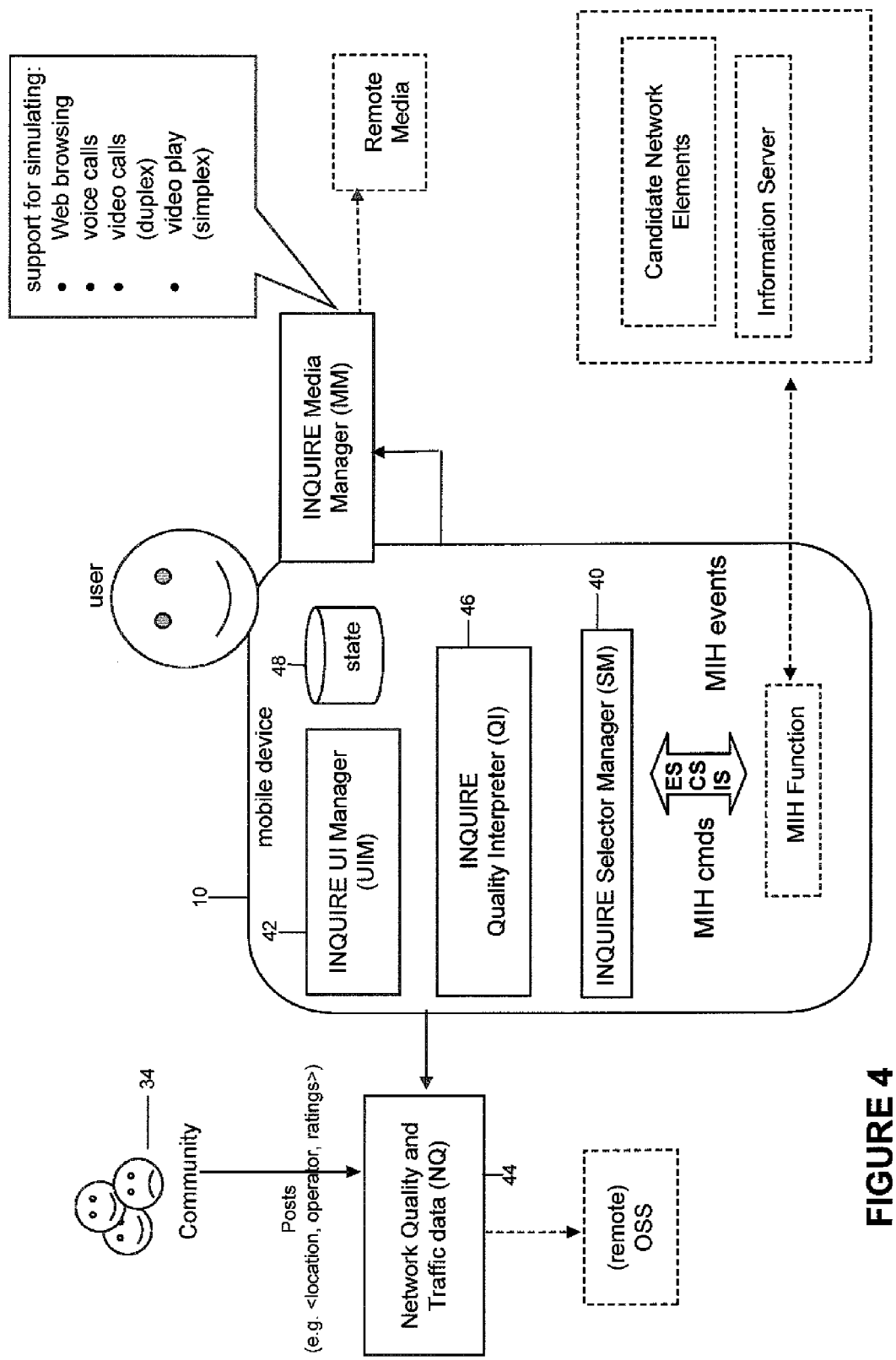
FIG. 4 shows system components of an embodiment of the invention.
Figure 5:
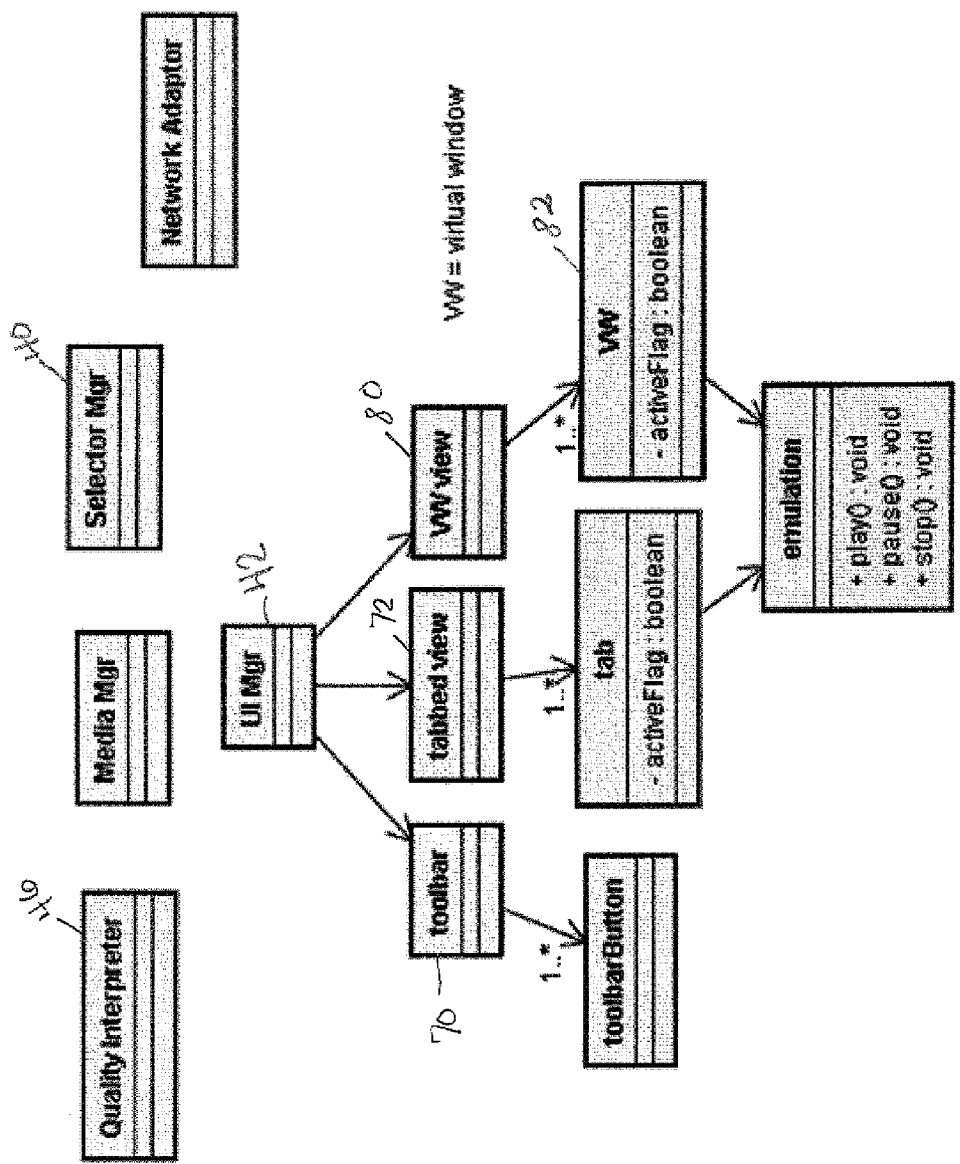
FIG. 5 shows a logical model and composition of components of an embodiment of the invention.

The INQUIRE functional and logical architectures are shown in FIG. 4 and FIG. 5. The functional components can include INQUIRE Selector Manager 40, INQUIRE User Interface (UI) Manager 42, INQUIRE Network Quality and Traffic data server 44, INQUIRE Quality Interpreter 46, and State 48. A description of these functional components is as follows.

INQUIRE Selector Manager 40 can listen for 802.21 MIH events (new networks), convey 802.21 MIH commands, such as to attach to a network after user selection, initiate query of new network metadata, e.g. to information server, as required, decide when a new INQUIRE user session should begin or end, and ask the UI Manager 42 to begin a session. It can also be configured to use syntaxes other than those defined or extended from 802.21, assuming that the syntax and semantic express network discovery, metadata, and network commands similar to those found in IEEE 802.21.

The INQUIRE UI Manager 42 is triggered by INQUIRE Selector Manager 40. The INQUIRE UI Manager 42 has the following features. It has the ability to create and present a QoE presentation of different types: a) those that actually connect to the network on one or more radios, access a presentation and allow interaction or limited interaction with it, b) those like in (a) but with interaction disallowed, c) those that do not connect to a network and are pre-recorded (possibly modified before playback) and played-back to give the QoE effect, and d) those that are purely quantitative and give no graphics but only numbers. It might also allow the user to interact during a multi-window session where the same session is presented in multi-windows and user interactions are caught and applied to each window so as to give the impression that the user is using each session directly. Interactions might include, but are not limited to, making voice calls, hearing music, watching video or navigating Web sites. The UI, shown in FIGS. 7 and 8, can also have a toolbar which enables a user to choose the current RAN, and to stop all emulations and exit, to begin a particular emulation, to display information, such as various metadata details, e.g., bit rates, costs, etc., on this RAN, to "reset"/"restart", or to choose a desirable QoE session for final selection and attachment.

INQUIRE Network Quality and Traffic data server 44 stores canonical information relating Mobile Service Providers and their network access points, e.g., Mobile Switching Centers, to prior QoE ratings. This data server 44 may be seeded by users and/or systems manually (e.g., users might manually enter their subjective ratings of networks into a form and submit it to the server) or automatically (e.g., system might infer ratings based on choices and send those to the server). Data may be suitably anonymized. This data server 44 can be queried by other components and can provide QoE metrics when given a named access point.

INQUIRE Quality Interpreter 46 can perform requests for QoE metrics from the Network Quality and Traffic data server 44. The Quality Interpreter 46 can also parse and interpret results and decide on a course of action.

The State component 48 can provide data that is shared between INQUIRE components.

FIG. 5 shows the logical relationship between emulations and the UI Manager 42 component through various other logical system components. As shown in FIG. 5, the UI Manager (UI Mgr) 42 connects with the toolbar 70, tabbed view 72 and virtual window (VW) view 80. The toolbar 70 and tabbed view 72 are also shown and described in FIG. 7; the VW 80 view is also shown and described in FIG. 8. The tabbed view 72 includes one or more tabs, each having a boolean active-Flag indicating if the session is active or not. Similarly, the VW view 80 has one or more VWs, each having an active-Flag. Any of the tabs or VWs can connect to the session to emulate activities of play, pause and stop.

Figure 6:
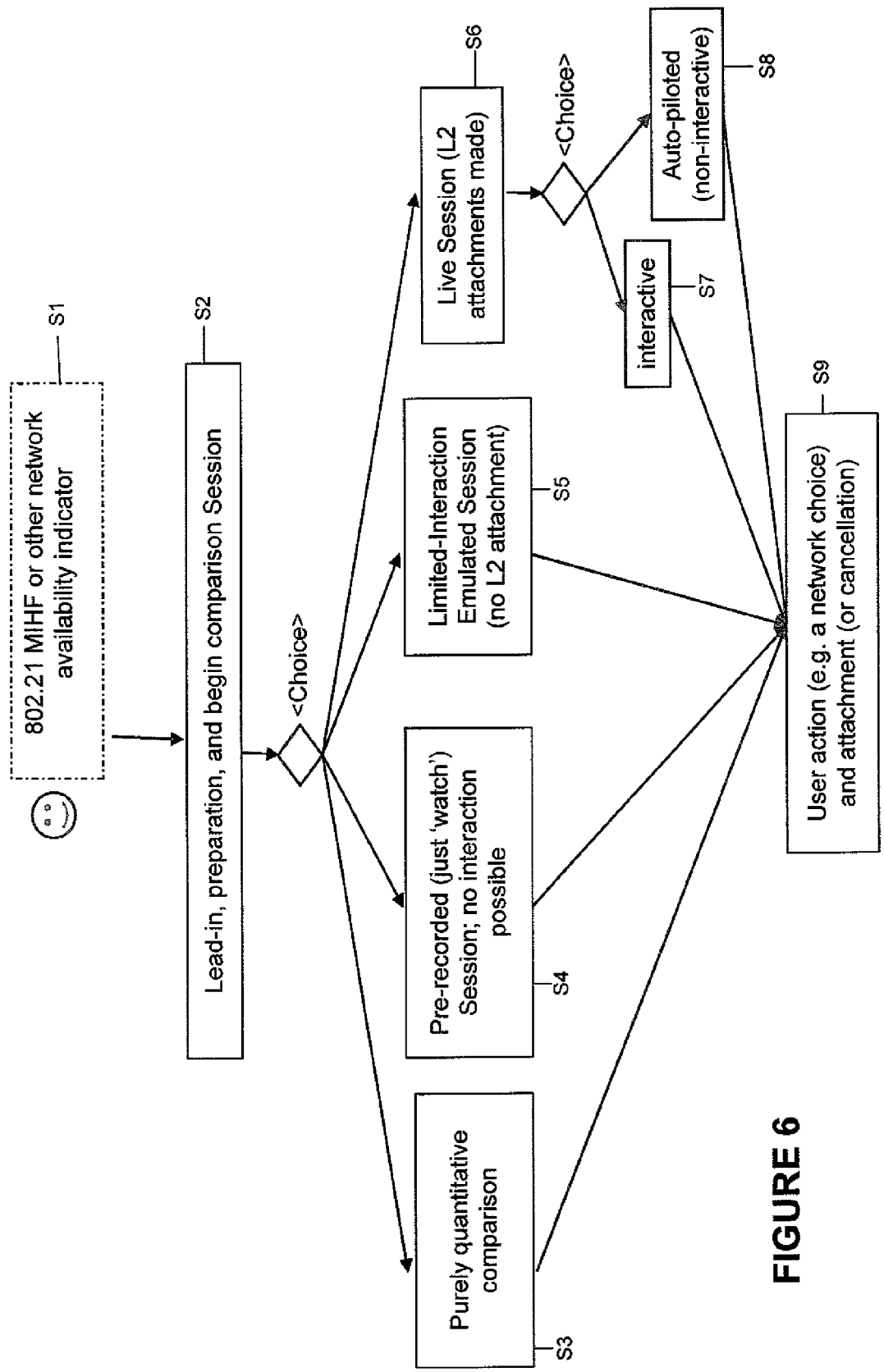
FIG. 6 is a flow diagram of types of squatting sessions possible in an embodiment of the invention.
Figure 9:
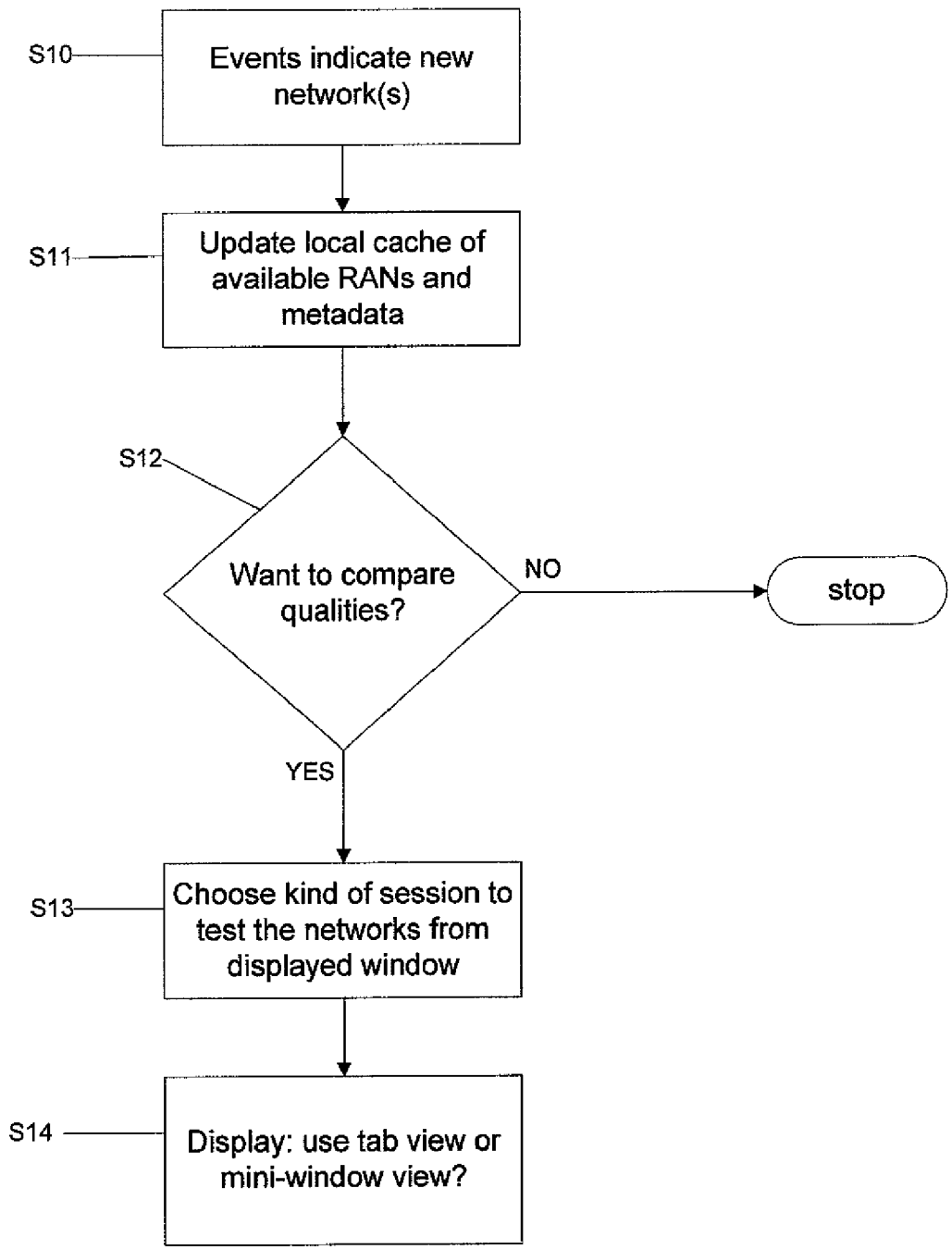
FIG. 9 shows a use case flow for beginning a comparison session.
Figure 15:
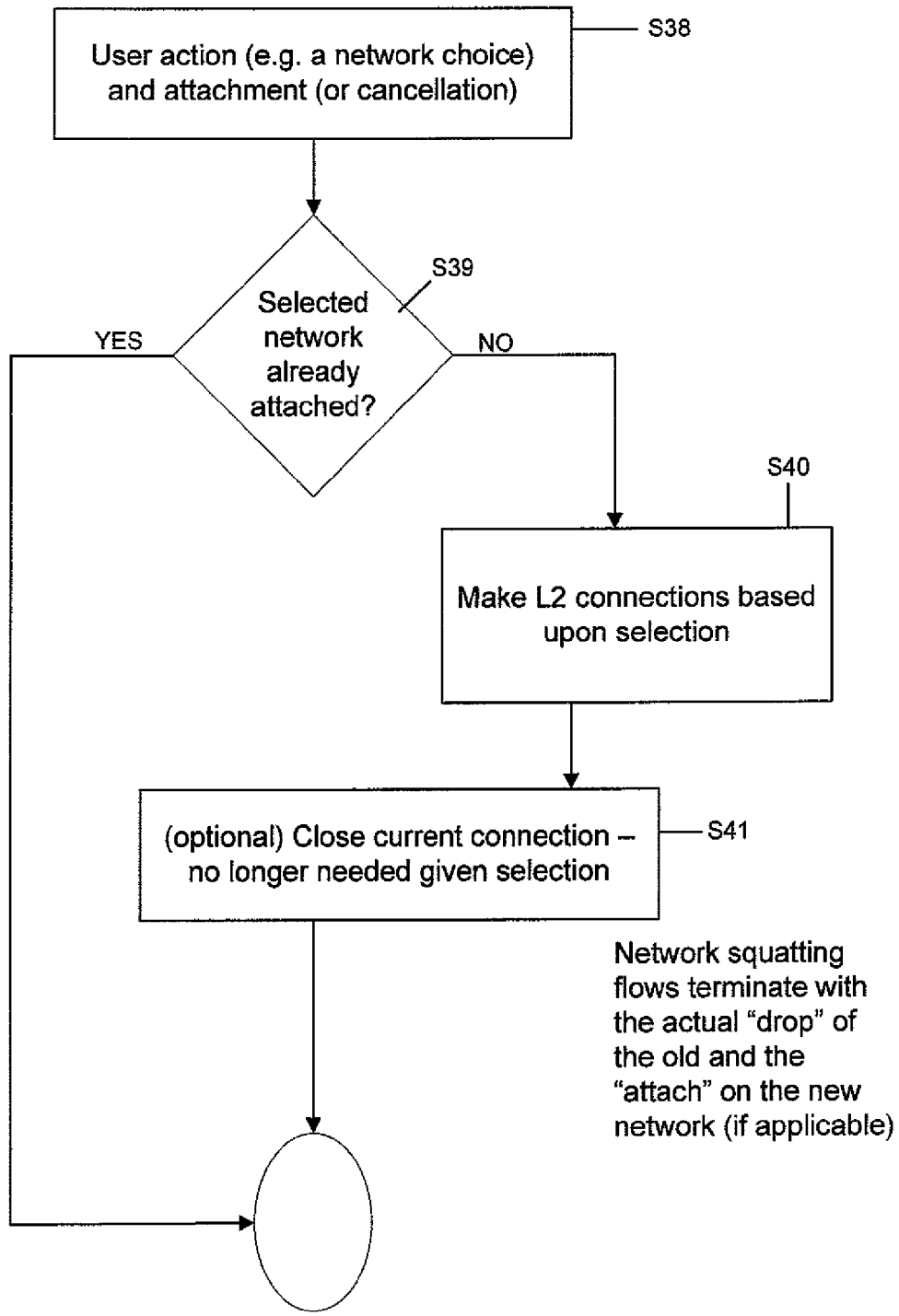
FIG. 15 shows a common flow for finalizing user selections after comparison sessions.

FIG. 6 illustrates a flow diagram of one embodiment in which emulation or comparison of more than one network is performed; this flow diagram depicts how the user may choose one of a type of comparison sessions, e.g., a presentation style, to be engaged in at the moment that the system deems necessary. The flows begin and end with specific common actions such as choosing and attaching to a network (if not already bound to) and so on. If only one network is chosen, "comparison" is an emulation of the one network. As shown in FIG. 6, in step S1, the user receives a network availability indicator. Lead-in, preparation and begin comparison/emulation session is performed in step S2. Additional details for step S2 are shown in FIG. 9 and described below. The user chooses the next activity. After the user's selected activity is performed (see steps S3-S8), the user action and attachment is performed in step S9. Additional details for step S9 are shown in FIG. 15 and described below.

Figure 10:
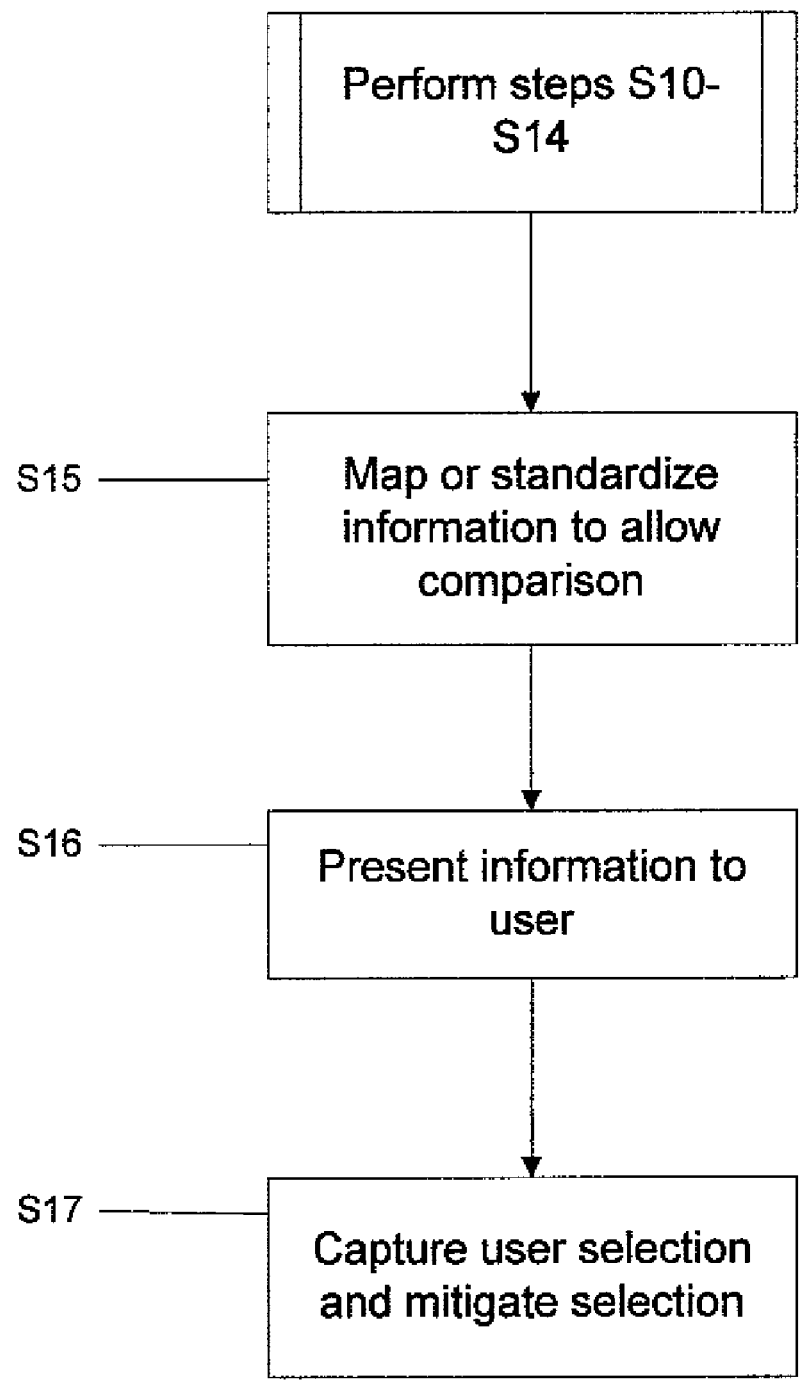
FIG. 10 shows a use case flow for a quantitative comparison session.
Figure 11:
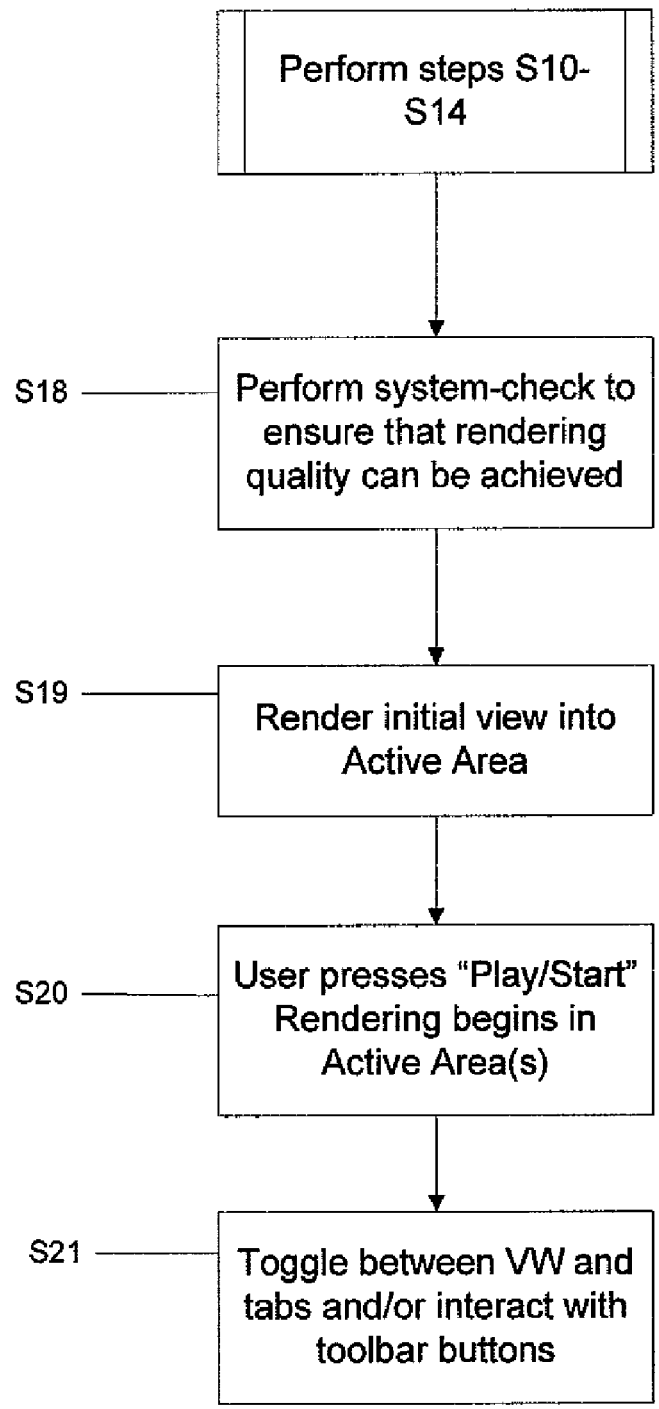
FIG. 11 shows a use case flow for a pre-recorded static comparison session.
Figure 12:
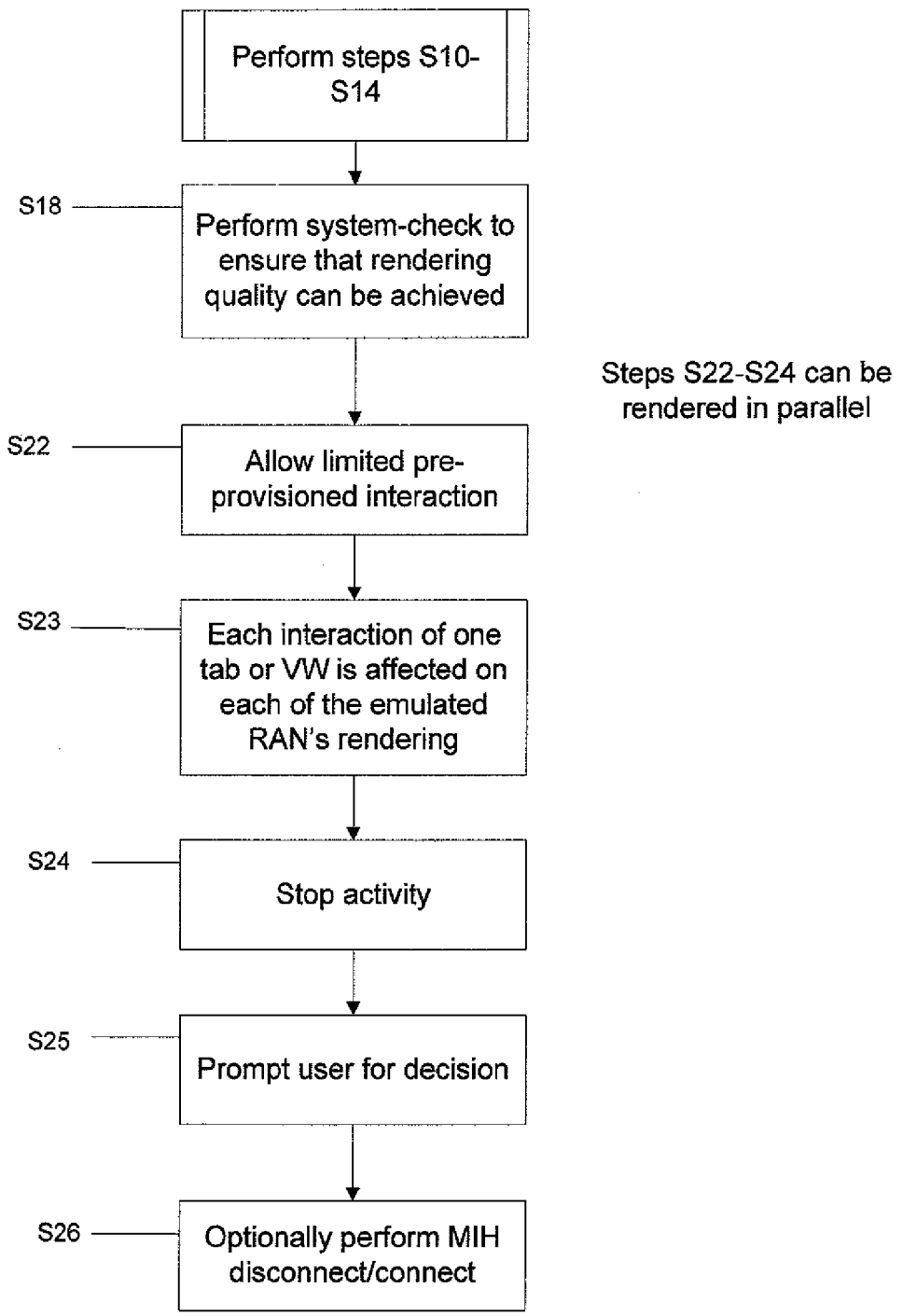
FIG. 12 shows a use case flow for emulated attachment with limited interactivity flow.
Figure 13:
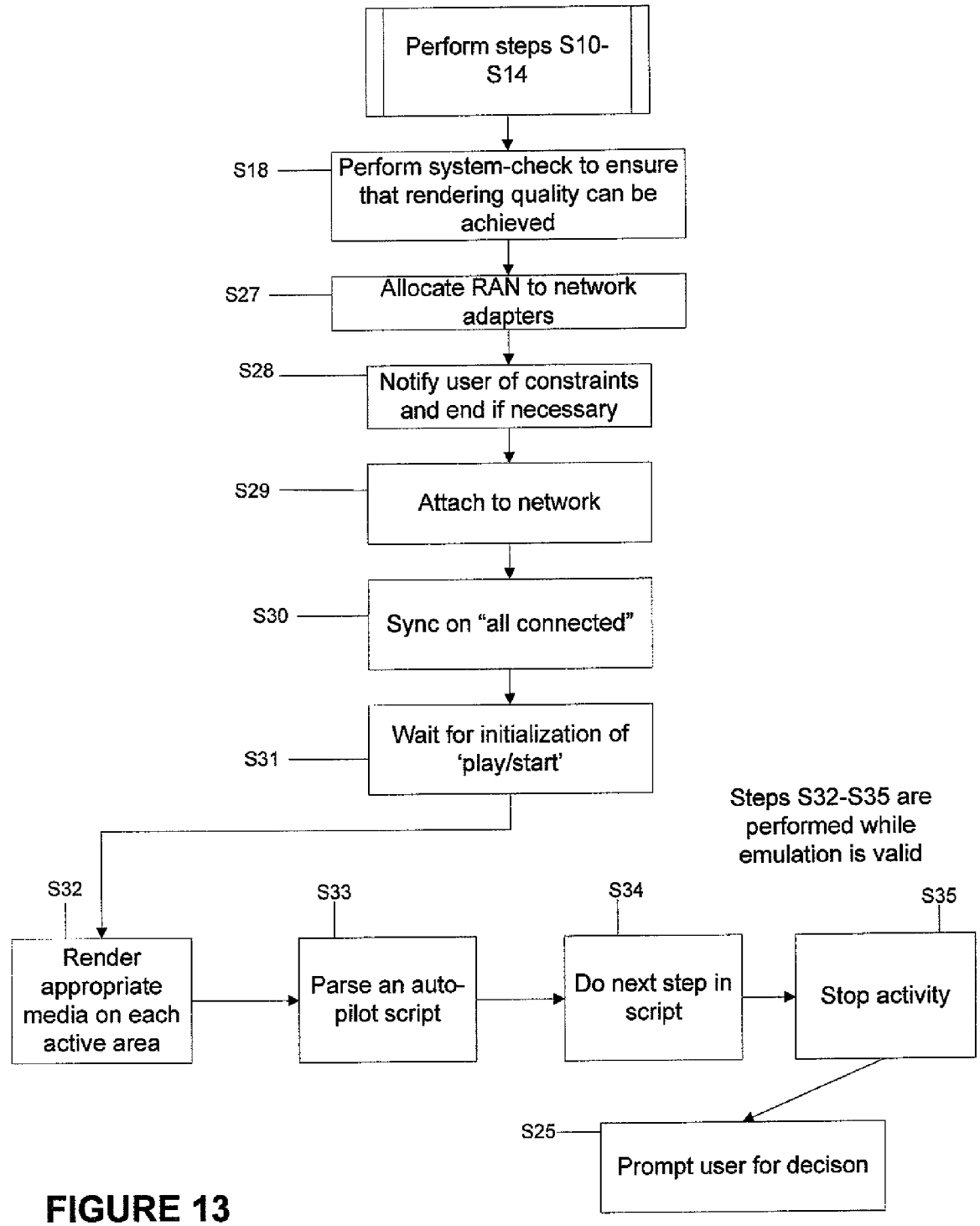
FIG. 13 shows a use case flow for a live (attached) comparison session with "automatically-controlled".
Figure 14:
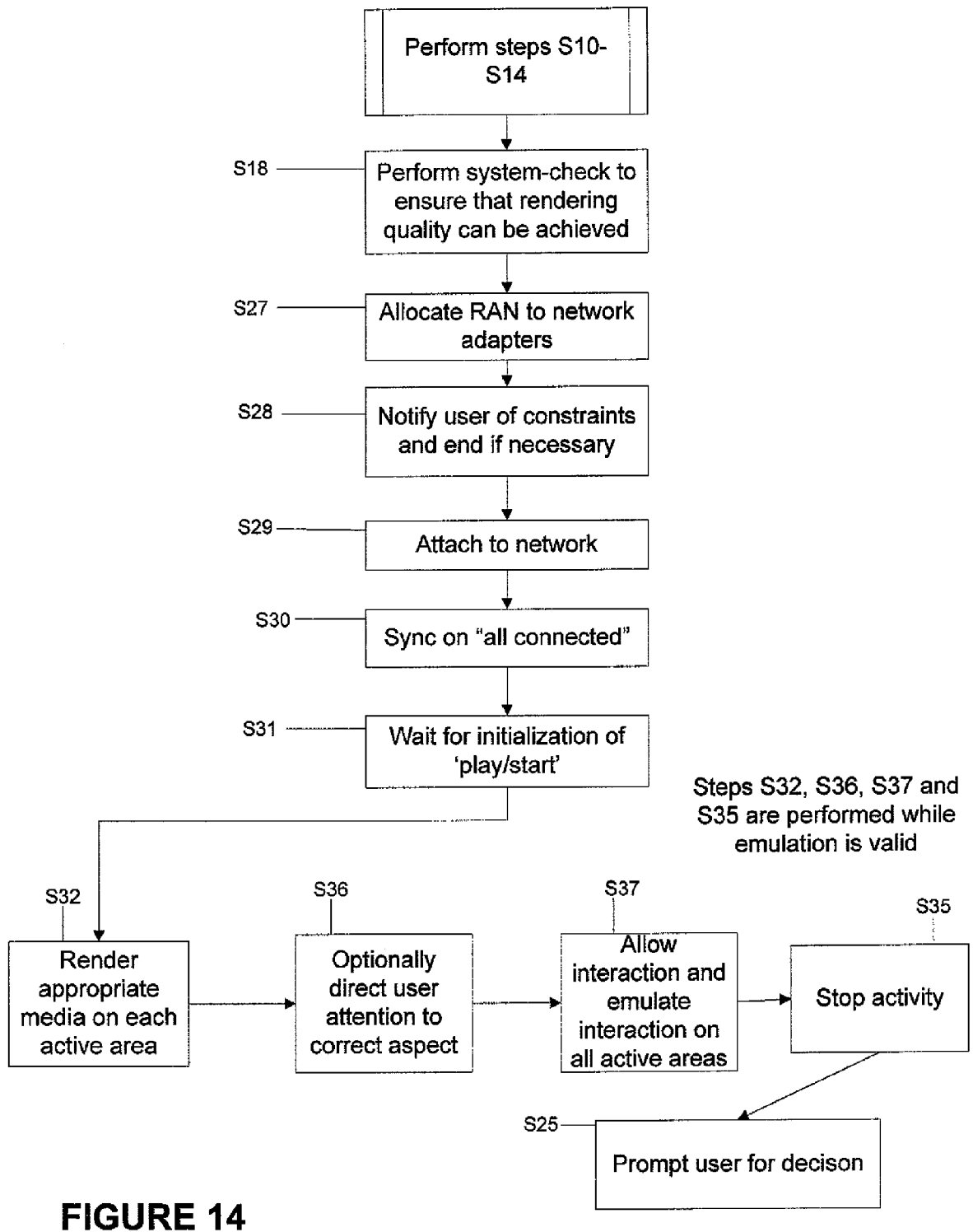
FIG. 14 shows a use case flow for a live (attached) comparison session with limited interaction allowed.

If purely quantitative comparison is selected as the user's choice, a quantitative comparison among the other networks that are available is performed in step S3. Additional details for step S3 are shown in FIG. 10 and described below. If a pre-recorded session is selected, step S4 is performed and the user can watch a pre-recorded session; no user interaction is possible in this session, though it conveys the appropriately styled experience. Additional details for step S4 are shown in FIG. 11 and described below. If a limited interaction emulated session is selected, step S5 is performed; no L2 attachment is made. Additional details for step S5 are shown in FIG. 12 and described below. If live session is selected, in step S6 the user chooses either interactive or non-interactive. If interactive live session is selected, step S7 is performed. Additional details for step S7 are shown in FIG. 14 and described below. If automatically-controlled live session is selected, step S8 is performed to emulate a non-interactive live session. Additional details for step S8 are shown in FIG. 13 and described below. The selection of the experience session type may be selected by the user or automatically chosen based on a user a priori preference or some other policy.

Figure 7:
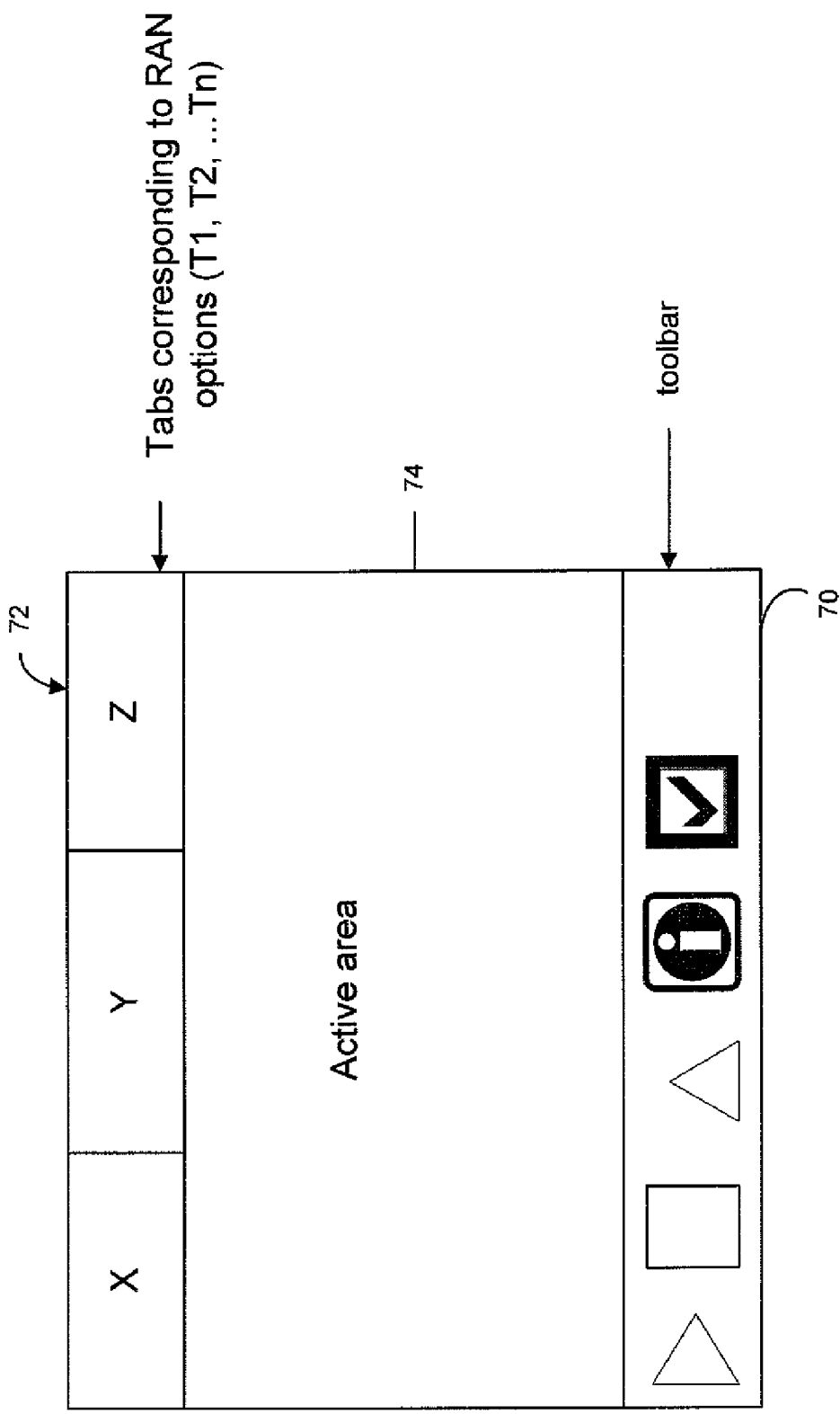
FIG. 7 shows the UI Manager, active areas and tabs in an embodiment of the invention.

The UI Manager 42 is able to render the QoE comparison in tabbed mode. FIG. 7 shows a portion of a display on a mobile device 10 having tabs 72 corresponding to RAN 12 options (T1, T2, . . . Tn), an active area 74 and a toolbar 70. UI Mgr 42 can render a Tabbed pane (one tab per network). The active area 74 can contain a space in which QoE is conveyed visually; in another embodiment, audio may be played. The toolbar 70 can be managed and rendered and from this toolbar, the user can control and affect the rendering.

Figure 8:
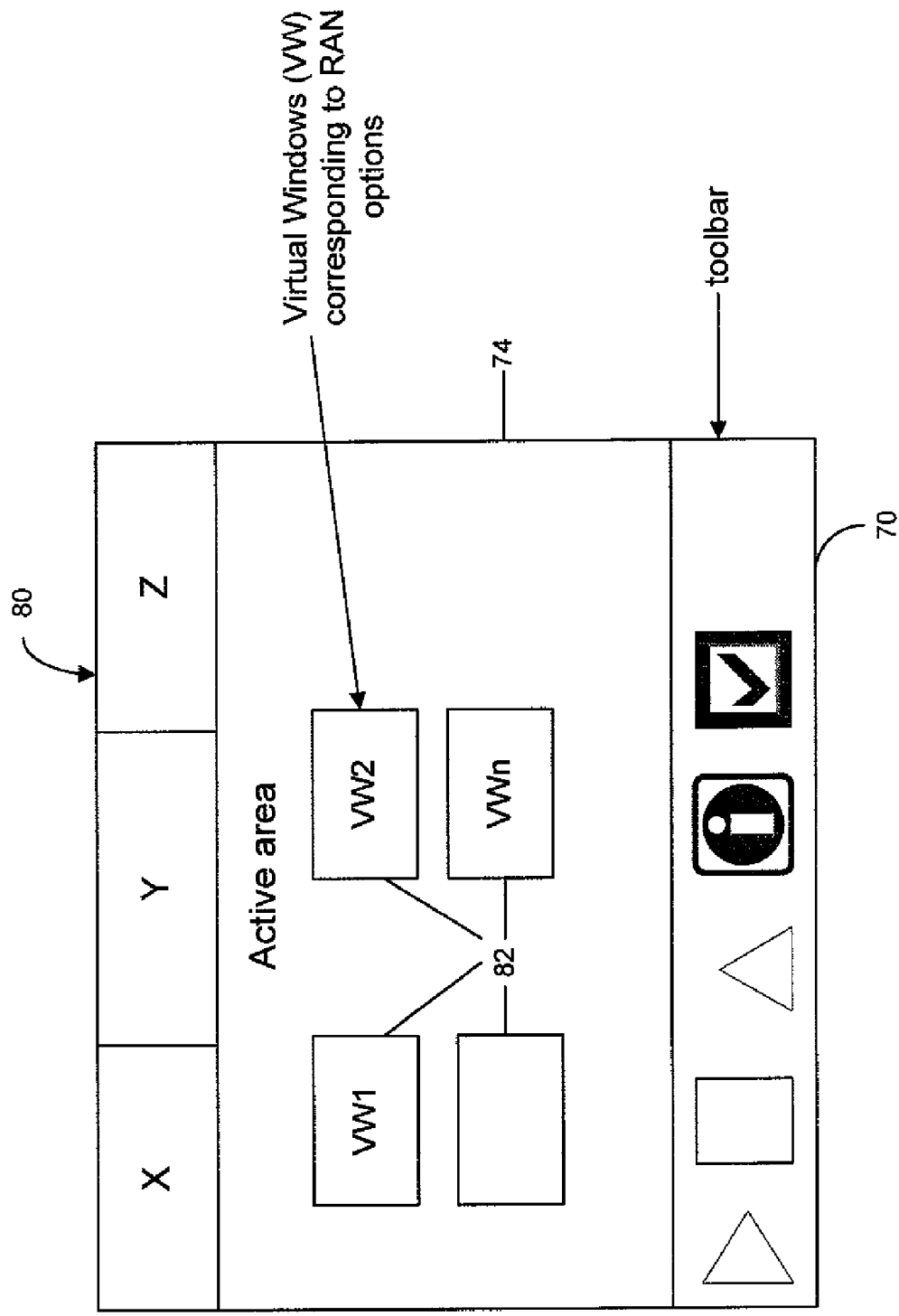
FIG. 8 shows the UI Manager, active areas, toolbar, tabs and virtual windows in an embodiment of the invention.

UI Manager 42 is also able to render the QoE comparison in multi-window mode or virtual window view 80. As shown in FIG. 8, active area 74 can convey QoE for all networks in question in small windows 82; these windows may admit to blowup views to allow the user to zoom in on particular parts at will. Certain user actions can be replicated across all windows so the user can continue to get a comparative QoE presentation even while interacting; for example, clicking on a link in one window performs the same function in all windows. As with tabbed mode shown in FIG. 7, this mode also has a toolbar 70 from which the user can control and affect the rendering.

The UI Manager 42 uses a process synchronization method to ensure that emulations occur in synchronicity if and when necessary. Hence, UI Manager 42 can update the presentation of the network-related information to maintain a fair representation of the one or more RANs being emulated. For example, if the system is attempting to show how video would look on both Verizon®'s and Sprint®'s networks, and is using a side-by-side video comparison, then it can be done "fairly" and systematically. While a process synchronization method is typically used to obtain "fairness", the inventive system and method is not limited and can use any appropriate means to obtain fairness for the comparison.

Preferably, the UI Manager 42 presents emulations and renderings for the user that comprise common uses of the network or preferred uses, as defined by the user, such as Mobile Web Browser emulation, Mobile video player emulation, etc. The invention is not limited to these and in a more general embodiment the user may select from a list of application types to emulate; the code for rendering the emulations may be local or loaded remotely.

System flows are now presented. FIG. 9 is a flow diagram of an exemplary "Begin a Comparison" Session, which is summarized as step S2 in FIG. 6. In step S10, 802.21 events indicate new networks, e.g., encapsulate network information. In step S11, local cache of currently available RANs and their metadata is updated, which can include pulling information from a server over a data connection. In step S12, a dialog window displays "A new set of networks is available. Want to compare qualities and possibly attach? {Yes, No}". If the user chooses Yes (S12=YES), the Dialog window displays "Choose the kind of session to test on the networks {Web Browsing, Voice call, Video (one way, e.g., YouTube), Videoconference (two-way), Other, Don't Care, Unknown}". In step S13, the user chooses an option from the displayed window and then, in step S14, the Dialog window displays "Want to use QoE_Tabs view or QoE_MiniWindows view to compare?" If the user does not want to compare qualities (S12=NO), the process stops and no comparison is performed.

To get community metrics, the following steps can be performed. Initially, a user selects an emulation type. For each RAN to be emulated in this session, remotely call external server to get network quality and traffic data, and store the data in canonical form. Then, the data can be used in emulations.

FIG. 10 is a flow diagram of an exemplary "Quantitative Comparison" Session. Perform steps S10-S14 (see FIG. 9) to determine user options and to load (and cache) necessary information to compare the networks from external systems, e.g., OSS, Web Service, etc. In step S15, map or standardize information to allow comparison. In step S16, present information to the user using tab view, list view, or graphics, e.g. charts, to show the information comparing the network QoE parameters (whatever they may be). In step S17, capture user selection, and mitigate selection, e.g., see Step S9 in FIG. 6.

FIG. 11 is a flow diagram of an exemplary "Pre-recorded (static) Comparison" Session. Perform steps S10-S14 (see FIG. 9) to determine user options and to load (and cache) necessary information to compare the networks from external systems, e.g., OSS, Web Service, etc. In step S18, perform system-check to ensure that rendering quality can be achieved. In step S19, render initial (paused) view into Active Area (tabs or VW's). In step S20, in response to the user pressing "play/start" button, rendering begins in active area(s), e.g. VW's, tabs. In step S21, the user can toggle between VW or tabs, and can also interact with various toolbar buttons. The session ends at user selection, e.g., user chooses to end session, or at cancellation.

FIG. 12 is a flow diagram of an exemplary "Emulated Attachment, Limited Interactivity" session. Perform steps S10-S14 (see FIG. 9) to determine user options and to load (and cache) necessary information to compare the networks from external systems, e.g., OSS, Web Service, etc. In step S18, perform system-check to ensure that rendering quality can be achieved. Steps S22-S24 can be rendered in parallel; each step is performed for each RAN in the list. In step S22, allow limited pre-provisioned interaction, e.g., some Web links, or voice commands, examples, etc. In step S23, each interaction of one tab or VW is affected on each of the emulated RAN's rendering. In step S24, stop activity, e.g., toolbar actions, as directed or after n seconds. In step S25, prompt for and manage user decision, such as a decision on which radio network the user would like to attach to, having experienced the emulations on several of them. Another user decision would be to 'cancel' and remain on the same network he started on. In step S26, optionally perform MIH disconnect from network and/or perform MIH connect.

FIG. 13 is a flow diagram of an exemplary "Comparison Session, attached with Automatically-controlled". Perform steps S10-S14 (see FIG. 9) to determine user options and to load (and cache) necessary information to compare the networks from external systems, e.g., OSS, Web Service, etc. In step S18, system-check to ensure that rendering quality can be achieved. In step S27, allocate RANs to Network Adapters capable of connecting. In step S28, notify user of any incompatibilities or constraints and end flow if necessary. For each RAN, in step S29, issue 802.21 MIH commands, e.g., attach to Network, on the appropriate network adapter. In step S30, sync on 'all connected'. In step S31, wait for initialization of 'play/start' button. Perform steps S32-S35 while emulation is valid. In step S32, render appropriate media on each active area (tab, VW). In step S33, parse an automatically-controlled script or set of preset actions that affect the rendering. In step S34, do the next step in the script. In step S35, stop activity, e.g., toolbar actions, if a user-decision is made, or after n seconds. In step S25, prompt for and manage user decision.

FIG. 14 is a flow diagram of an exemplary "Attached and Interactive" session. Perform steps S10-S14 (see FIG. 9) to determine user options and to load (and cache) necessary information to compare the networks from external systems, e.g., OSS, Web Service, etc. In step S19, perform system-check to ensure that rendering quality can be achieved. Perform steps S27-S31 (see FIG. 13). Perform steps S32, S36, S37 and S35 while emulation is valid. In step S32, render appropriate media on each active area (tab, VW). In step S36, optionally direct user attention to the correct aspect. In step S37, allow interaction, e.g. some Web links, or voice commands, examples, etc., and, after each interaction, emulate the interaction on all active areas. In step S35, stop activity, e.g., toolbar actions, if a user-decision is made, or after n seconds. In step S25, prompt for and manage user decision.

In another embodiment, the inventive system allows the presentation of both emulated and real "sessions" within a single choice session for the user. For example, the UI Manager's rendering may be comprised of a series of rendering locales, i.e., tabs or virtual windows (VW), inside each of which a rendering occurs. A subset of the rendering locales may be from attached network connections while another subset may be driven by a purely emulative algorithm. That is, any combination pre-recorded, limited interaction, or live sessions is supported in the invention.

FIG. 15 is a flow diagram of an exemplary "Finishing off a Session with a Mobile User" session. In step S38, a user action, e.g., a network choice, and attachment (or cancellation) is performed. In step S39, the system determines whether or not the network selected in step S38 is already attached. If the selected network is attached (S39=YES), no further steps are needed. If the selected network is not attached (S39=NO), L2 connections are made based on the network selection in step S40. Optionally, in step S41, a current connection can be closed, if it is no longer needed based on the network selected in step S38. Flows terminate with the actual "drop" of the old and the "attachment" onto the new radio access network (if applicable).

Figure 16:
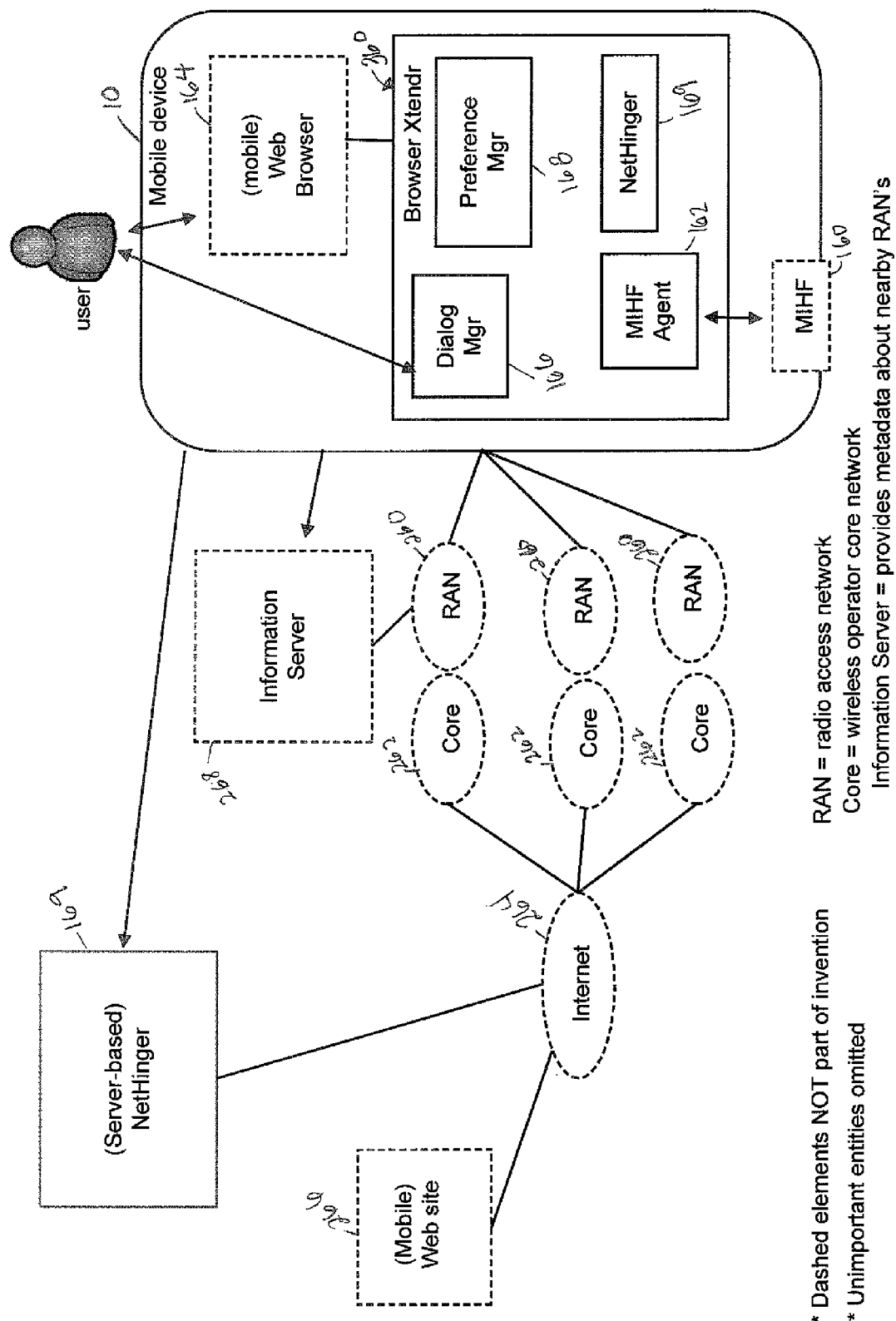
FIG. 16 shows functional parts of a software component in an embodiment of the invention.

Another embodiment of the inventive system is shown in FIG. 16, which shows a software component in a mobile device 10 with functional parts of MIHF connector 160, MIHF Agent 162, Web content analysis and link advisor 169, Web browser connector 164, Dialog Manager 166 and Preferences Manager 168. In this embodiment, the invention may be embodied and/or deployed in some or all of the following ways, in whole or in part. One way is as Web browser "add-on" (e.g. Mozilla Firefox® and Opera® browsers support "add-ons"). Another way is at system level, e.g., as a native operating system component. Yet another way is as a standalone contained mobile application. Still another way is as a server-side application which communicates with a minimal thin client on the mobile side situating most of the computation on the server-side. Ranks and analysis of page content for network impact is a configurable function. In one embodiment, the inventive system uses an external implementation of the function.

These components of the inventive system and method can provide RAN-aware notifications to users based on their mobile Web browsing activities both within and external to mobile Web browsers. The components intercept and understand the operations the user is making with the browser, and fuse the semantic of the current operation with its knowledge about surrounding RANs to provide an actionable suggestion. These components can also comprise an automated way for optimal web browsing on wireless networks, providing a tradeoff between the technical steps of network connectivity and the awareness of network opportunities for the human user.

In the embodiment shown in FIG. 16, external components, whose presence is necessary, include RAN 260, Core 262, e.g., core private network of the service provider, Internet 264, and Mobile Sites 266, e.g., Internet-accessible Web sites intended for access by mobile devices. Optional additional components can include one or more information servers 268, each of which can provide information about RANs and other information that may include neighbor maps, link layer information and availability of services. The 802.21 Media Independent Information Service (MIIS) is an example though any functionally comparable system is sufficient. The device must have a Web browser, such as Firefox® or Opera®, or a custom software that otherwise implements the HTTP and HTML standards, offers Web browsing capabilities to the user, and is functionally extensible by some reasonable means (for example, Firefox® calls these extensions "add-ons").

In one embodiment, high level functions of the invention, collectively called NetHinger 169, include the following. One high level function enhances the mobile Web browsing experience by catching in real-time Web browsing actions made by the user (such as loading a page, clicking a link, or selecting a page element) and notifies the user when a candidate surrounding RAN better suits those actions or intents. A Web intent (or browsing action) might include the selection of a link leading to a new page, or a click on a link to a phone number which will initiate a voice session. Another function includes receiving information in near real-time from an information server about surrounding networks and their availability and capabilities, expressed within, for example, IEEE 802.21 MIIS information elements. Optionally, a component can use alternative radios to actively probe network conditions on nearby candidate RANs. For example, a user's Web browsing session may be active upon the 3G radio spectrum but the user's mobile device may actively track performance conditions of other nearby networks using its Wi-Fi radio and connecting to a server that supplies such information.

In one embodiment, the invention components measure or read (from a server) and store so-called impact analysis for a set of mobile Web pages. Impact analysis is a series of <pageID, impact-vals> pairs that associate impact values (IV) (expressed in a syntax defined in a schema) to particular mobile Web page ID's. An IV is a machine-readable expression of the effects of different access networks and qualities of service (e.g., available bandwidth, jitter) on resulting QoE. While it is not possible to a priori define exactly how quantitative measures will affect the QoE from a given user's point of view, if authored beforehand the IVs can be created from heuristics. Alternatively, if read from a server that has been previously seeded with QoE ratings from individual users, IV's can comprise an aggregated rating of QoE from a group of users. To gather IV's from users, the invention can occasionally present the user with a form to be filled out, or the short message service (SMS) may be used to gather ratings from users on their QoE with a given network at a given time. The inventive system includes functions that compute IV for particular Web pages on demand; the technique for this may be a series of if-then-action statements that verify certain characteristics of the given Web page and when conditions are met a particular IV metric is created. For example, it might check if there is an embedded video on the page (ID=ABC) and, if so, might create IV metrics such as <ABC, GSM_HIGH_QOE>, <ABC, WIFI_HIGHEST_QOE>, indicating that the page is likely to get best QoE rankings by attaching to GSM or Wi-fi networks to view it. Additional functionality can also include computing impact in generic all-purpose mode or taking in network conditions to make a specific analysis, e.g. computing impact of the page on a given variety of network types, or computing impact of the page for a fixed a priori set of network conditions and types, and leaving the user to interpret the result.

The invention may be embodied as a Web Service using W3C Simple Object Access Protocol (SOAP) envelope, XML/HTTP document, and/or a socket connection with fixed length binary message structure, or other comparable data transport methods. Further, the invention may be deployed in a Server employing the inventive system (in the network), as a standalone component in the mobile device or a combination of the two options with some functionality in the network and some on the device.

Figure 17:
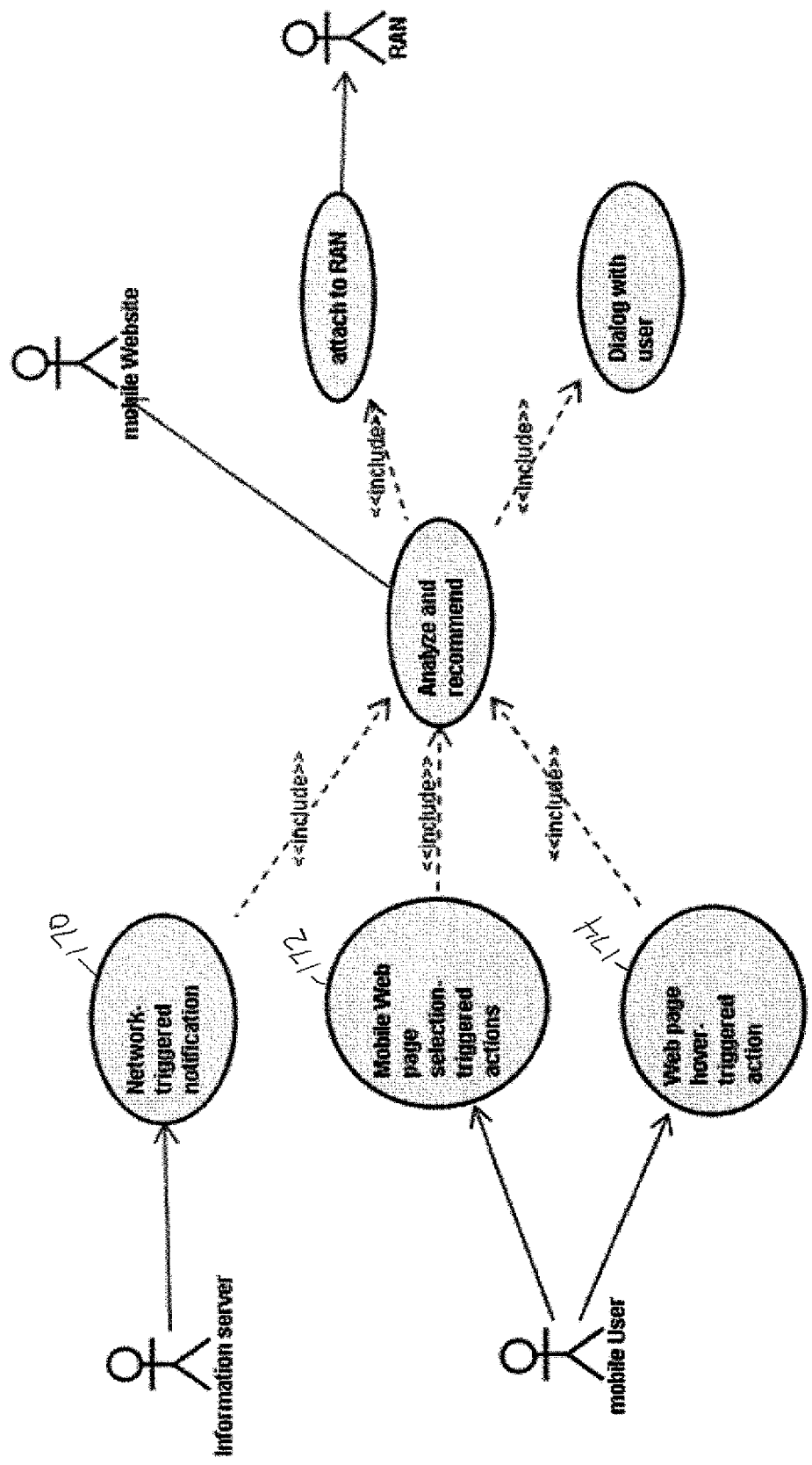
FIG. 17 shows high level use cases in an embodiment of the invention.

The high level use cases of an embodiment of the present invention are shown in FIG. 17. A first use case, U1, is triggered by the Information Server, or is network-triggered notification 170. The information server in the networks transmits a structure encapsulating a description of a network in range of the user. The message is parsed and analyzed; the impact of this network on the current and possible next Web pages are analyzed; the system then generates suggestions for RAN associations based on user Web intents (derived from watching the user interact with a Web browsing tool). The invention engages the user in a dialog to convey and collect information and/or subsequently attaches to a RAN with the intent that subsequent Web browsing will be of perceivably higher QoE; interactions with the mobile Web content then follow. The process may also be seeded with user preferences so that the user is not always in-the-loop. Taking the user out of the loop, however, makes the system only as strong as the automatic analysis. Having the user in-the-loop allows the invention to show the user an emulation of QoE when necessary to let the user 'see for herself', however briefly.

A second use case, U2, is Mobile Web page selection triggered 172. The mobile user clicks on a Mobile Web link on the Web browser. Instead of allowing the Web browser to immediately load the page linked-to in the current Web page, the invention components intercept the user's link selection action and check if there are Impact Values associated with the destination URL. The flow continues as in U1 wherein the system might recommend a more appropriate in-range RAN for the current Web content.

A third use case, U3, is Mobile Web page hover action triggered 174. The mobile user hovers his Web browsing cursor over a link, the link destination is examined with respect to impact analysis and the flow continues as in U1 and U2.

Figure 18:
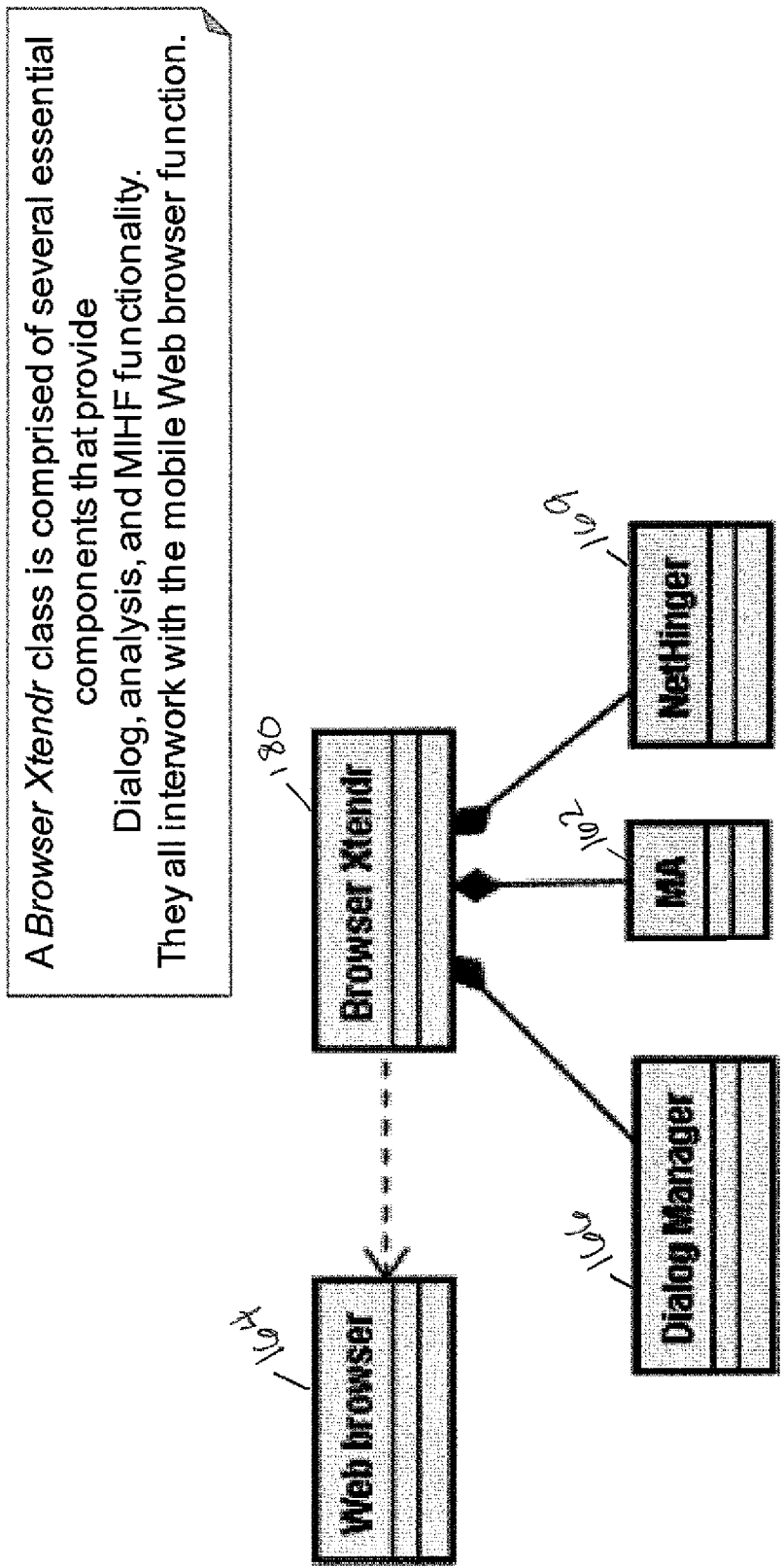
FIG. 18 shows components in an embodiment of the invention.

The components of the system providing these functions and usages are shown in FIG. 18. They include Browser Xtendr 180, an extension, or "add-on" to a mobile Web browser tool enabling the novel inventive functionalities described thus far. The technology of browser add-ons is well-known, which makes add-on technology very appropriate though it is not the only way to implement the invention. The Browser Xtendr 180 can be comprised of a Dialog Manager 166, NetHinger 169, MIHF Agent (MA) 162, and Preference Manager 168.

The Dialog Manager 166 manages interactions with the user, rendering of dialogs and gathering of information from the user via forms dialogs and so on. At the request of NetHinger 169, the Dialog Manager 166 interacts with the user to both present information to the user and ask the user in what way(s) she'd like to engage surrounding networks to support the mobile browsing session. NetHinger is described below. MA 162 interworks with the Media Independent Handover Function (MIHF) resident on the mobile device 10 (or with a different function with comparable capability—MIHF is not strictly required). While MIHF has access to lower level protocols and Service Access Points (SAP), MA 162 shields the invention components from this. MA's main role is to receive and relay information regarding surrounding RANs and their attributes to the NetHinger. Preference Manager 168 stores user preferences relating to RAN usage, possibly relating to media types or Web sites. Preference Manager may be consulted by NetHinger or Dialog Manager to temper computations or interactions, and can be seeded and updated by the user and/or the service provider. As a simple example, Preference Manager 168 may have an assertion stored that for Websites containing streaming video of type T, user X prefers RAN's of type W.

Figure 19:
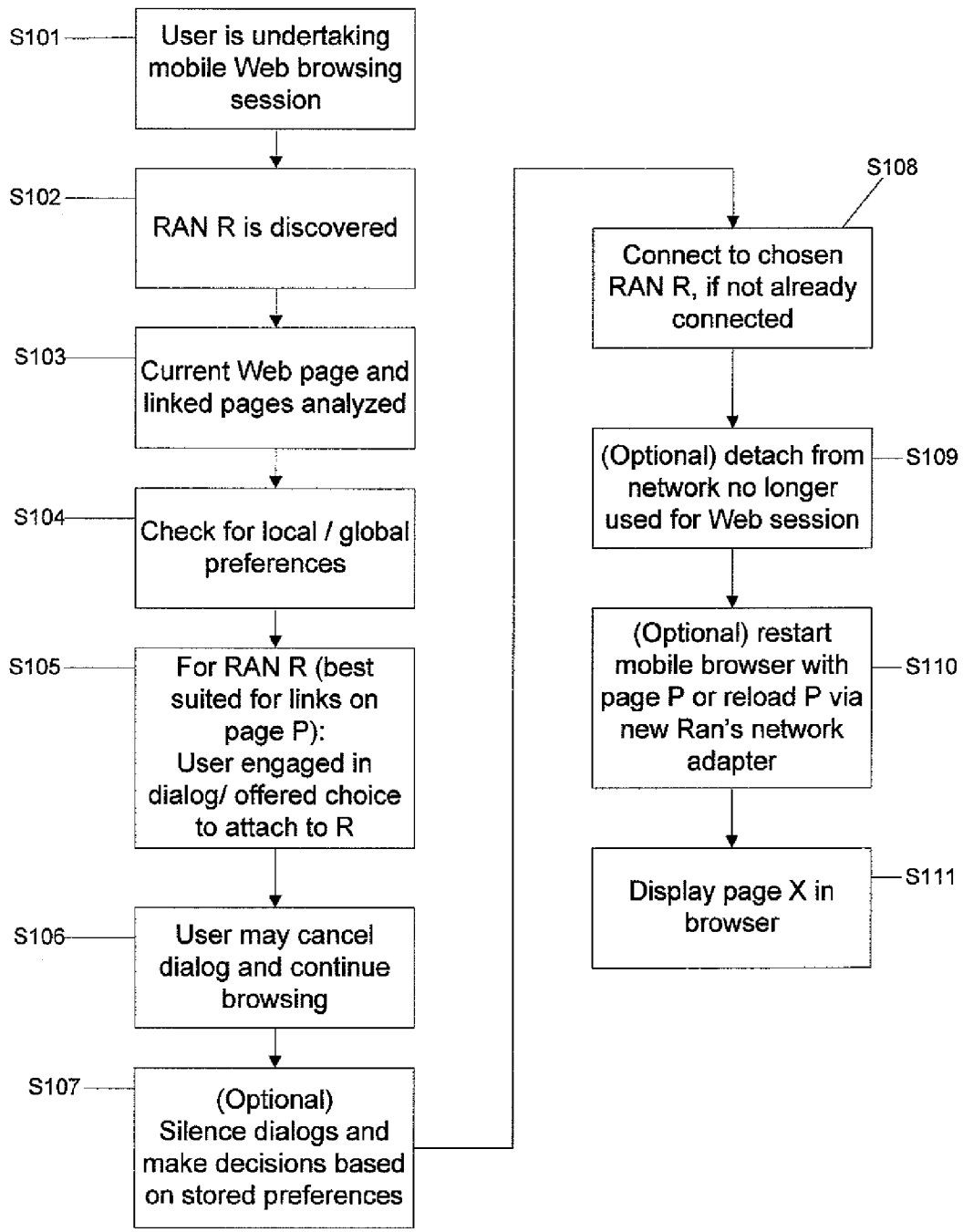
FIG. 19 is a flow diagram of new RAN discovery and mobile web page examination in an embodiment of the present invention.

Some exemplary system flows follow. Flow F1, shown in FIG. 19, illustrates the flow when a new RAN is discovered nearby, and the current or next mobile Web page is examined for suitability with respect to the new RAN. In step S100, user is in a mobile Web browsing session. In step S101, RAN R is discovered as surrounding network; R's information elements are understood with respect to a known schema. In step S103, the current Web page P and the linked pages from P (L1, L2 . . . ) are analyzed, their characteristics understood, and are checked for suitability with the current attached network as well as all surrounding RANs (or some subset of those RAN's), now including the new RAN called R (see Flow F5). In step S104, a check for local or global preferences that relate user to networks or services is performed. When R, best suited network for the links on page P, is determined, in step S105, the user is engaged in a visible dialog that integrates with the browsing experience and that clearly explains the situation and the possible advantages of using a new network (e.g., improved QoE). In step S106, the user is offered the choice of attaching to and using R for subsequent browsing. In step S107, the user may "cancel" or "close" the dialog and simply continue browsing. Optionally, in step S108, the user may configure the NetHinger system to silence dialogs temporarily or permanently and to make automated decisions based on stored profiles or preferences. If not already connected to chosen RAN, interwork with MIHF client to attach to chosen RAN and optional detachment from network no longer used for Web session is performed in step S109. Optionally, in step S110, the Restart mobile browser can be restarted with page P or reload P via new RAN's network adapter. If R is a type of network that corresponds to an unused radio on the mobile device then both the original link and the link to R can be maintained and used in the browsing session; browsing data can be streamed through multiple adapters and assembled as necessary. Step S111 displays page X in the browser, as X is the page linked-to by the chosen link on page P (e.g., pointed to by one or more of L1, L2 . . . ).

Figure 20:
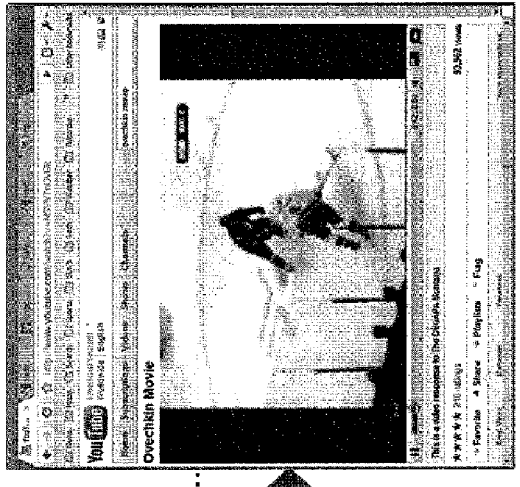
FIG. 20 shows mobile web page selection triggered in an embodiment of the present invention.
Figure 20:
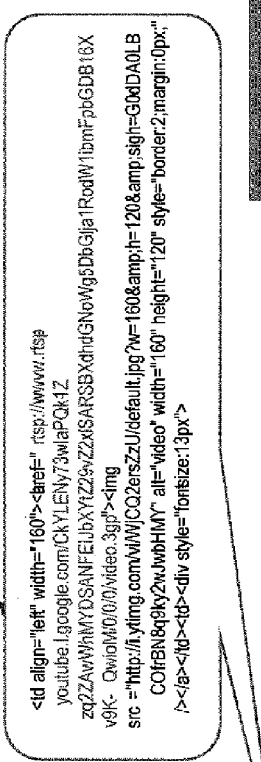
Figure 20:
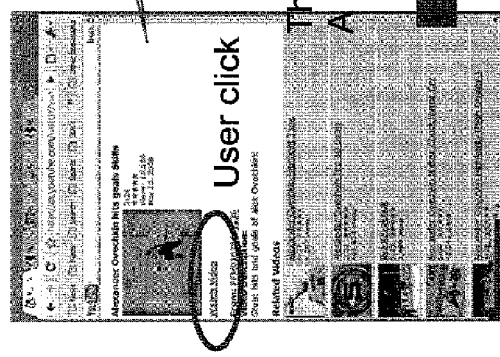
Figure 20:
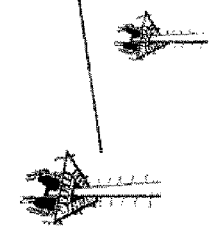
Figure 21:
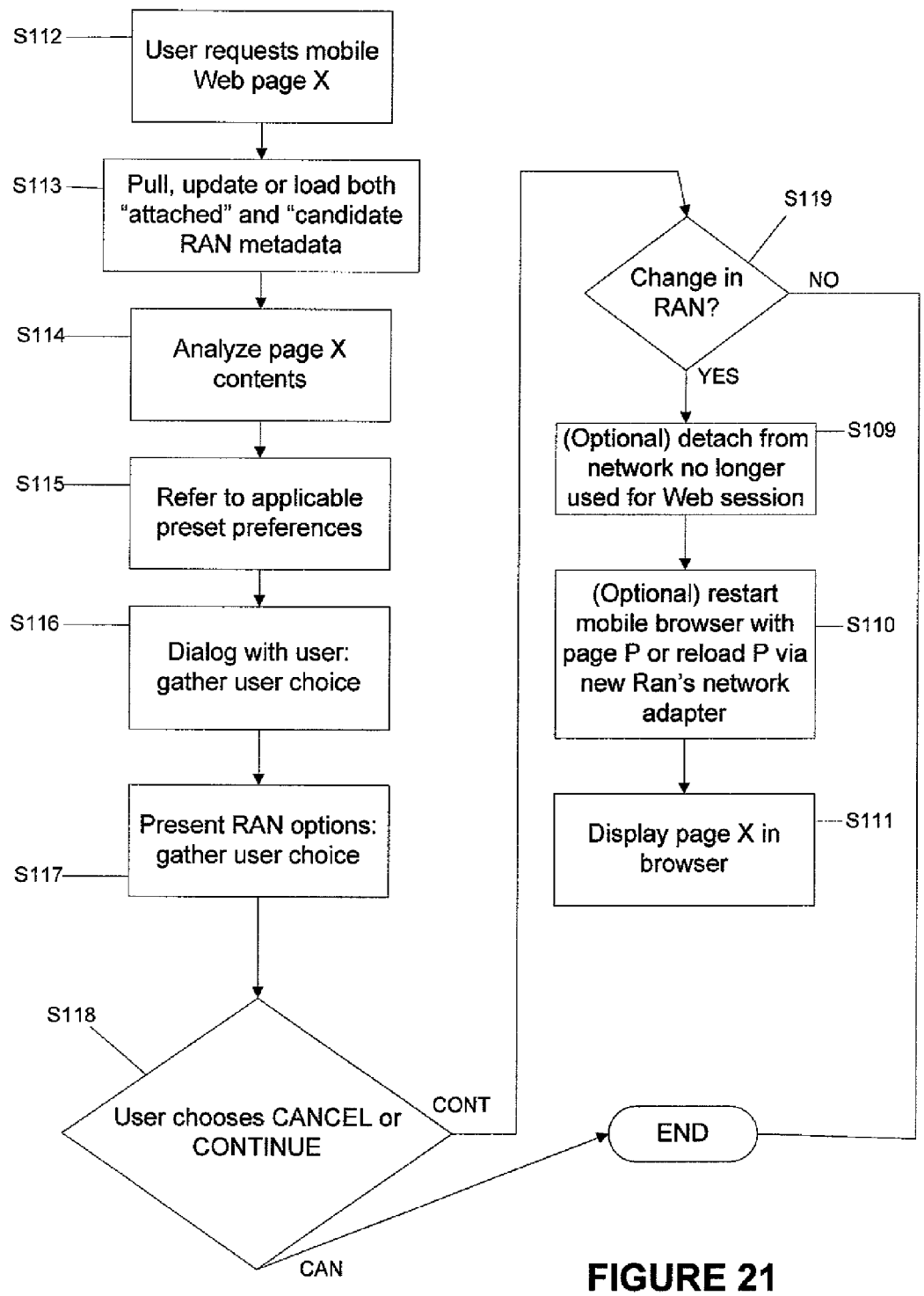
FIG. 21 is a flow diagram of triggered web page selection in the embodiment shown in FIG. 19 of the present invention.

Flow F2, shown in FIGS. 20 and 21, has invention steps regarding the flow of the Mobile Web page request; in-between a page request and the page's rendering, the invention gives advice on RAN suitability and possibly performs ATTACH action (e.g., acquiring a link and network connection), etc. FIG. 20 is a schematic of Flow F2. FIG. 21 is a flow diagram of Flow F2. In step S112, user requests a mobile Web page X. In step S113, pull, update, or load both "attached" and "candidate" RAN metadata A, B, C (which may include bandwidth, QoS expectation, availability metrics). In step S114, analyze page X contents; this is described in more detail below. In step S115, refer to applicable preset preferences. In step S116, create a dialog with the user and gather user choice, if applicable. In step S117, present RAN options, optionally highlighting a recommended one (not shown in FIG. 20), to the user. In step S118, gather user choice, including 'cancel'. If the user's choice is 'cancel' (S118="CAN"), then end. Otherwise (S118="CONT"), determine if a change in RAN is required in step S119. If no change in RAN is required (S119=NO), then done. Otherwise, if not already connected to chosen RAN, in step S120, interwork with MIHF client to attach to the chosen RAN. Optionally, as with Flow F1, perform steps S109 and S110, to detach from network no longer used for Web session and to restart mobile browser with page X or reload X via new RAN's network adapter. In step S111, as described above, display page X in browser.

Figure 22:
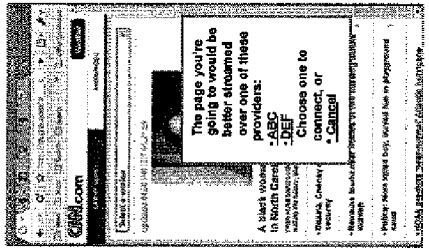
FIG. 22 shows mobile web page hover over in an embodiment of the present invention.
Figure 22:
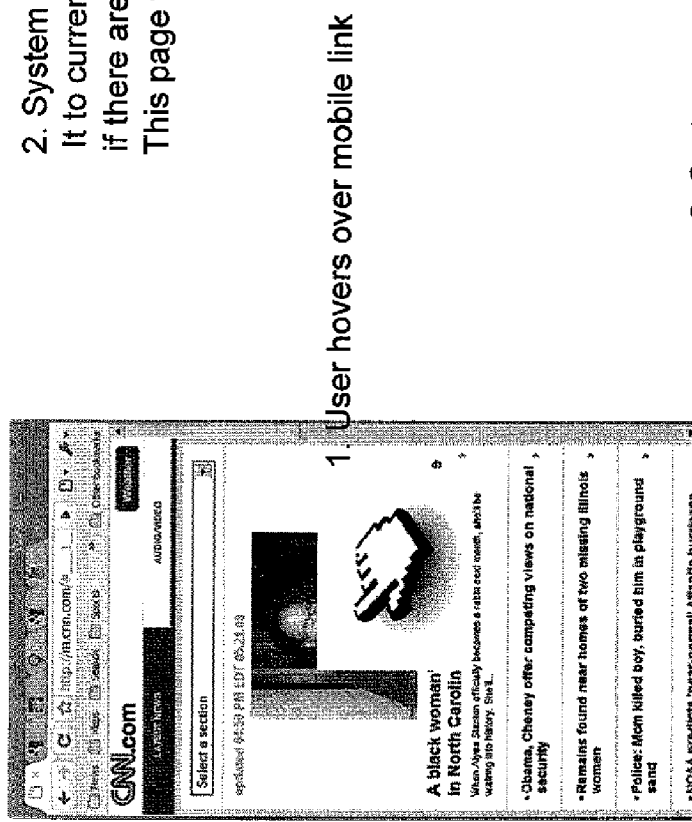
Figure 23:
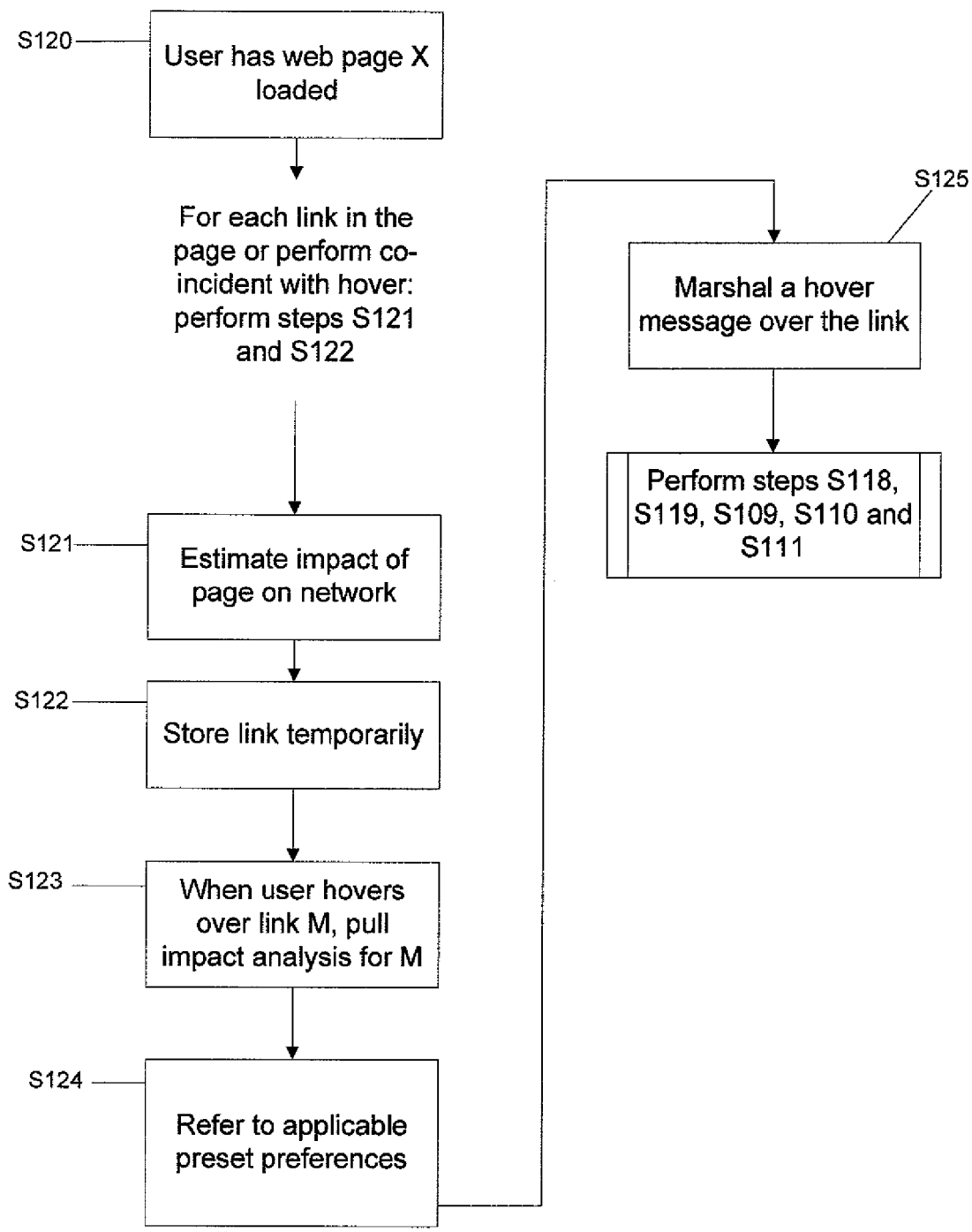
FIG. 23 is a flow diagram of mobile web page hover in the embodiment shown in FIG. 22.

Flow F3, shown in FIGS. 22 and 23, illustrates an inventive embodiment in which the system should be able to "look-ahead one link" and so provide advice on RANs suitable for links that the user hovers over (e.g., each link points to a single Web resource) with a mouse or touches with a pointer or finger on a touchscreen. In step S120, the user has Web page X loaded, X has a series of links L, M, N. For each link in the page, or alternatively perform these steps co-incident with the hover action, in step S121, estimate impact of the page on the network, either by loading and analyzing its elements or via a NetHinger server or local component, and, in step S122, store the link temporarily. When the user hovers over a link M in step S123, the system computes or otherwise reads the impact analysis for M. In step S124, refer to applicable preset preferences. In step S125, marshal a hover message over the link. Perform steps S118, S119, S109, S110, and S111 as shown in FIG. 21 to perform a dialog allowing the user to clear the dialog and/or cancel, e.g., just continue browsing, to connect to an alternative network in parallel, and to connect to the new network and then drop the previous connection (possibly reloading the Web page).

Figure 24:
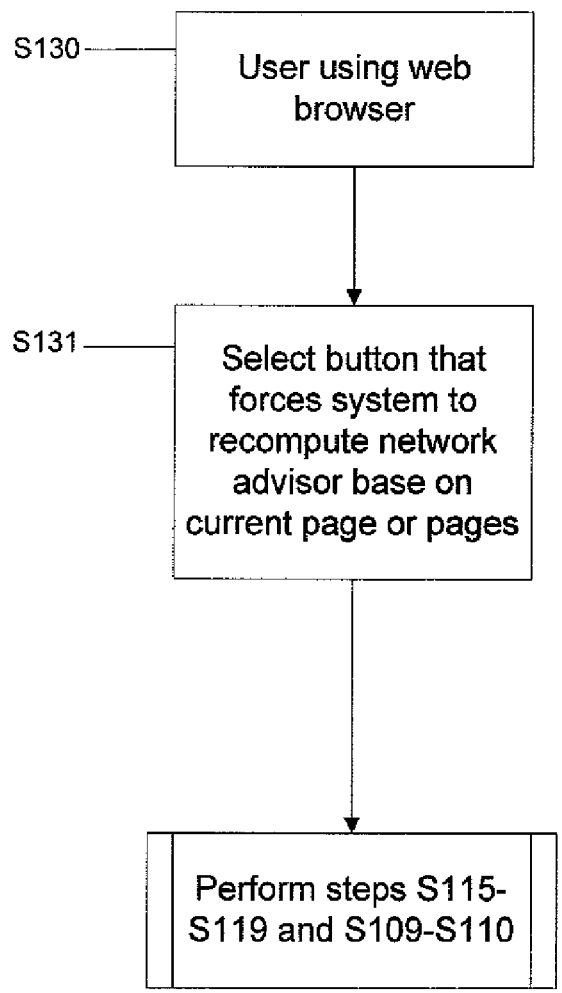
FIG. 24 is a flow diagram of a user requesting advice in an embodiment of the present invention.

Flow F4, shown in FIG. 24, illustrates the user using the inventive components on-demand to request "advice" on the RAN to use. In step S130, the user is using Web Browser. In step S131, the user selects a button to force the system to recompute network advisor based on current page or pages. Flow F4 continues with steps S115-S119 and steps S109-S110 as shown in FIG. 21.

Figure 25:
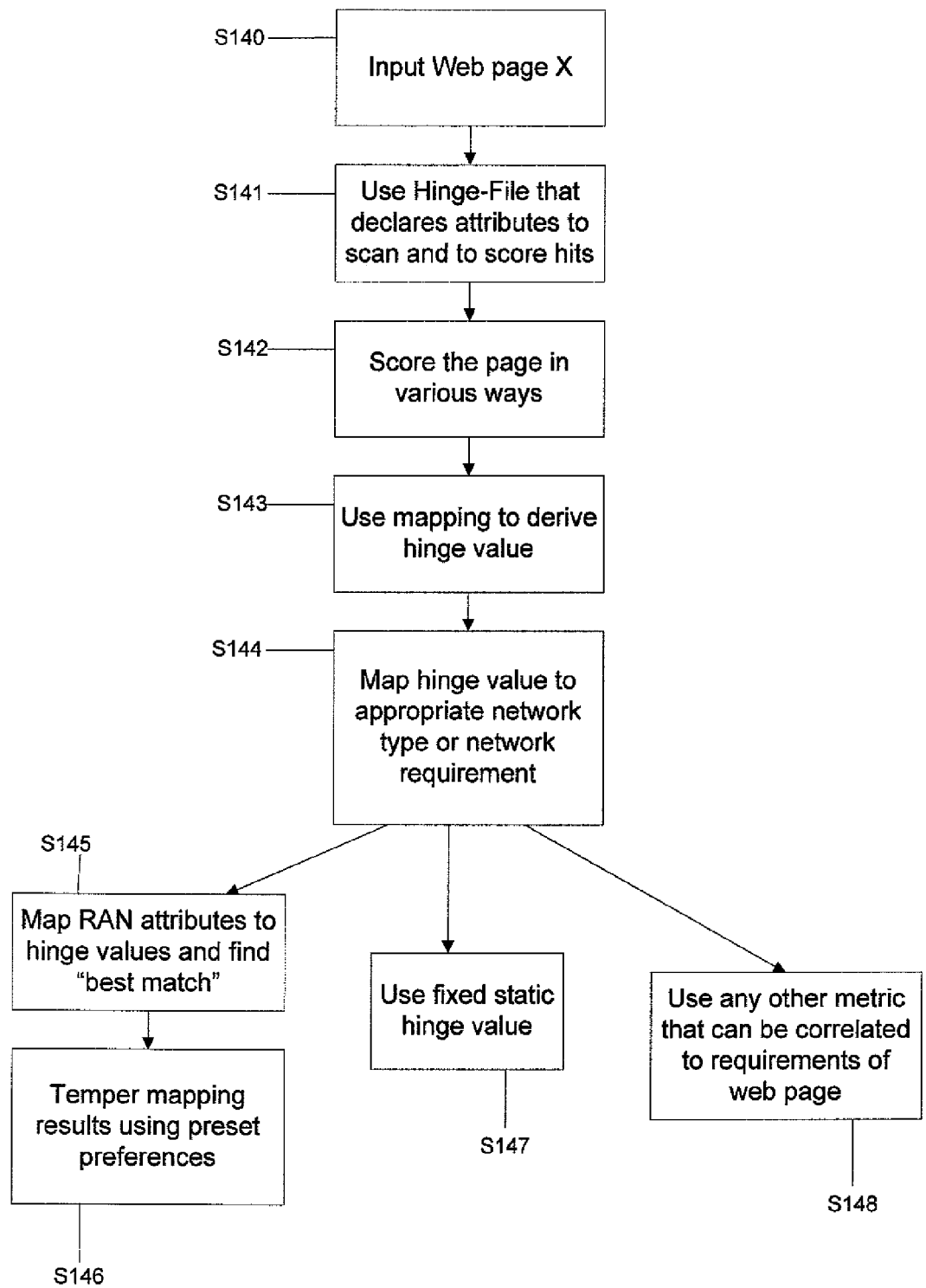
FIG. 25 is a flow diagram of a mechanism for analyzing and scoring in an embodiment of the present invention.

Flow F5, shown in FIG. 25, is an extensible mechanism to allow the invention to analyze and score various aspects of the Web page, and then determine best RAN by mapping those scores to RAN capabilities, found via Information Server or through active probing. A precondition for this process is the attached network and all candidate nearby networks are represented in the system; their suitability for various scored pages is known, e.g. they might themselves be 'prescored' with a range that indicates which scored pages should be associated with this network. In step S140, input Web page X. In step S141, use a hinge-file that declares the attributes to scan for in this page X and scores for their hits. They might include any of (but not limited to) the following: specific names and values in META tags, number of <img> tags and each one's height and width, number and source of javascript libraries, the number and destination of URL's, the number of embedded videos of each type, and others. In step S142, score the page in various ways, e.g., according to the hinge-file or other ways. In step S143, use the mapping to derive a 'hinge value' for each page. In step S144, map the hinge value to an appropriate Network type or network requirement. In step S145, as the network types, services, and attributes of RANs surrounding a given mobile user change dynamically with user location, map RAN attributes to hinge values and find a good match by taking the ones nearest to the hinge-value of the Web page, and, in step S146, temper mapping results by damping or augmenting values through preset preferences relating to the user or network. Alternatively, instead of steps S144-S146, in step S147, use a fixed static hinge value for the Web page stored in a server, or in step S148, use any other metric that can be correlated to the requirements of the Web page. This analysis and scoring of web pages can be performed as part of step S103 in F1 (FIG. 19), step S114 in F2 (FIG. 21), step S123 in F3 (FIG. 23) and step S131 in F4 (FIG. 24).

The system may make use of HTML or other tags or script elements to make mobile Web page characteristics machine-readable. Tags can be created once and then stored separately to the page, or with the page. For example, a custom HTML entity with attributes that capture appropriate network-sensitive attributes of the page can be created and stored. An example is:

```
<netHingeMark pagesize="10kb"
linksToStreamingMedia="2"
preferredLinkCapacity="256Mbps"
authoritycode="xyz"></netHingeMark>
```

The tags may describe the attributes of the page that affect QoE or otherwise express metadata that will help make the process of both rating Web pages and mapping between Web pages and network types semi- to fully-automatic.

System flow in this case is as follows. User selects a page to which to navigate on the mobile browser. HTML of the page loads. Before rendering, scan page for NetHinge markups and read them. If the authority code is correct, interpret the markups and marshal a list of networks or network types that are recommended for the page. If network types are provided by tags, resolve network types to available networks. Create a dialog with user to determine if user wishes to use a network he is not associated with currently but that promises superior QoE. Attach to the network.

The inventive system can be compatible with multi-core technology. The invention can be deployed as agnostic to the multi-core or architected so that it runs most effectively on multi-core platforms. For example, multiple concurrent emulations can be divided among multiple computing cores so that the emulations are given computing resources approximate to what they would receive should the mobile user select that access option.

Multi-core programming techniques and technologies are known in the art. These techniques can include programming with tasks, threads and abstractions in the right mix for the underlying hardware. A technology example can be found in Intel® Hyper-Threading Technology, which requires a computer system with an Intel® Processor supporting Intel® HT Technology and an Intel® HT Technology enabled chipset, BIOS, and operating system. Multi-core programming techniques can also include abstraction, such as OpenMP®, Intel® multi-threading building blocks.

In one embodiment, the UI Manager 42 component is developed to run in multiple parallel instances, one for each Virtual Window (VW) in the setting. In another embodiment, each 'Emulation' instance is run in a task or thread that, in a multi-core mobile device, can be allocated to the most capable core available. In another embodiment, the multi-core platform arranges to allocate equal processing to each "emulation" as they run in parallel, making the emulation's effect more realistic for the end user to gauge QoE.

In principle, because end-to-end QoE is difficult to measure and may be "best effort" in the core, it is advantageous to have an approach that allows a spectrum of QoE conveyance mechanisms. Benefits can include the ability to emulate attachment and QoE through various audio and visual modes, and the ability to actually attach and run brief emulations. The inventive system is desirable and gives an accurate—even if temporary and momentary—view of the quality possible for a given connection or session. Through emulated attachment, the invention can help present QoE experiences greater than what is even possible on the mobile device. In 'emulation mode', the system would depend on having an estimation of network-level resources and capabilities, e.g., jitter, bit rate, etc., for each network the system would like to render. These could come from the 802.21 information service, Network Operator, from user reporting, and so on. In the case where choosing an option would 'max out' the capability of the mobile device, the user is informed, as this could be something useful to know from the user point of view.

In one embodiment, the problem with trying to access mobile content with an inappropriate link connection is addressed. This situation may result in spotty and unreliable QoE for the user, dissatisfaction with the service or network, and so on. Indeed, as different pages may have different requirements, the user who remains attached on a given network may see changes in QoE between Web pages. In addition, today's mobile Web browsers provide little support for, or sensitivity to, changes in surrounding network capabilities. On a Web page by Web page basis, there is no mechanism to support user-notifications or dynamic link connections that reflect user browse actions. There is no current mobile middleware that locally (from the mobile) evaluates a current or anticipated Web page and advises and initiates link/network level actions to facilitate user experience.

While client-side content adaptation may convert or transform data on the mobile device for rendering, the present invention focuses on attempting to create a mapping between currently available RANs, determining the best one, connecting to the RAN and reloading the page content. Also, the inventive system is concerned with injecting dialogs into Web browsing sessions in realtime wherein those dialogs pause the loading of the linked page, convey advice about RAN suitability for the page, and then take action, possibly attaching to a new RAN. Further, the invention distinguishes from page ranking which is primarily concerned about analyzing Web pages and the links between them, assigning metrics and then ranking page importance. In the present invention, the ranking is an open configurable aspect and other functions such as monitoring Web browse events, e.g., mouse, click, hover, in conjunction with surrounding and associated RAN metadata are important in the invention.

Moreover, while the invention measures Web performance and loads, and considers analyzing page content and estimating total amount of data comprised therein, in the inventive system, such an analysis is a configurable single-step of a larger method. Also, a configurable set of browsing actions, including but not limited to mouse events, may trigger analysis functions, including analyzing, ranking, and relating characteristics of the web page to surrounding network capabilities. In addition, the invention creates a dialog listing the RAN possibilities at the given moment with respect to the Web page (or next linked-to web page).

The flows and integration found in the invention are nuanced and involve the careful management of notifications in mid-browse time, the interception of new network announcements from Information Servers, and the management of dialogs to capture the action from the user.

There are benefits for the participants. For the mobile user, benefits include that the user comes to understand more clearly the kind of mobile experience that can be expected on the various available networks. Another mobile user benefit is that mobile network operators (MNOs) will be judged on, and therefore will compete on, quality of experience, and may be incented to take network engineering steps to improve performance.

The device manufacturer can advantageously build parts of this invention into the device firmware/OS so that the interactive choice can occur. Devices with the novel capability described herein will be a source of competitive advantage. Device makers will be incented to produce devices that render services in a superior fashion.

For network operators, the best ones benefit and the weakest ones may not, as each network QoS is pitted against others in fair and open QoE comparisons. Network operators may support the invention method in order to be a part of this open system. They stand to see more (billable) traffic if their network has the attributes that attracts customers to it. In addition, network operators can infer a great deal about their network quality based on the decisions that users make. Operators can use the invention to test various network configurations. The invention and resulting user decisions provide a powerful analytic tool for network operators.

In one embodiment, additional advantages include that the invention is a network-centric adaptation approach, that is, Mobile Web content need not be adapted in advance or for all device types; instead, in this invention, the invention components present the user with network link attachment opportunities that have been 'ranked' as most appropriate for the given content. The invention can be tailored on a per-URL basis. Whereas 'content preview' automatically previews 'next links' visually, the present invention can do correlations to RANs on a per-network per-page basis as necessary.

Additional benefits to various participants in the inventive system can include the following. Customers get better mobile user experience. Since candidate networks may be used ad hoc, some operators will see increased network usage/billing, which may be a function of what classes of Internet content are accessed from a particular region and what networks are available there. Handset vendors who can embody this invention as a native on-board functionality may differentiate from competitors. Network operators and content providers can determine relationships between networks, content, and mobile users and make use of this for planning and advertisement. Network operators will gain greater insight into their network performance. Network operators may figure out where to put capital expenditures based on how and when users are attaching/detaching from their networks to support their mobile Web behavior.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for improving quality-of-experience of using a mobile device, composing:
   a CPU in the mobile device;
   a selector manager on the mobile device, said selection manager receiving events relating to radio access networks (RANs) of one or more service providers;
   a user interface (UI) manager operable to render the quality-of-experience of one or more of the RANs in accordance with a chosen presentation style;
   a network quality and traffic data server storing information relating the service providers and quality-of-experience ratings;
   a quality interpreter receiving requests for quality-of-experience metrics from said network quality and traffic data server and parsing and interpreting results of the quality-of-experience metrics to obtain the rendered quality of experience; and
   a state providing data shared between one or more of the selection manager, the UI manager, the network quality and traffic data server, and the quality interpreter,
   wherein the chosen presentation style is one of purely quantitative comparison, pre-recorded session, limited interaction-emulated session, live interactive session, and live automatically controlled non-interactive session and user input occurs in accordance with the presentation style.

2. The system according to claim 1, wherein the UI manager renders the quality-of-experience in one of multi-tabbed pane window mode, and simultaneously visible virtual windows mode.

3. A method for improving quality-of-experience of using a mobile device, comprising steps of
   storing information relating to radio access networks (RANs) of one or more service providers and quality-of-experience ratings;
   receiving, on a mobile device, an event from the RANs of the one of the service providers;
   receiving requests for quality-of-experience metrics based on the event;
   parsing and interpreting results of the quality-of-experience metrics to obtain the quality-of-experience;
   preparing, using a CPU, and beginning an emulation session of one or more of the RANs;
   choosing a presentation style;
   rendering the quality-of-experience in accordance with the chosen presentation style, wherein the chosen presentation style is one of purely quantitative comparison, pre-recorded session, limited interaction-emulated session, live interactive session and live automatically controlled non-interactive session; and
   enabling user input in accordance with the presentation style.

4. The method according to claim 3, further comprising the steps of:
   standardizing information to allow comparison of the information;
   rendering network-related information on a display of the mobile device; and
   updating the presentation of the network-related information to maintain a fair representation of the one or more RANs being emulated.

5. The method according to claim 3, further comprising the steps of
   performing system check both before and during rendering to ensure fair and efficient rendering;
   rendering an initial view into an active area on the mobile device;
   beginning rendering non-initial views in response to "play/start" button;
   toggling between tabs and virtual windows views in the active area; and
   interacting with toolbar buttons.

6. The method according to claim 3, further comprising steps of:
performing system check both before and during rendering to ensure fair and efficient rendering;
allowing pre-provisioned interaction;
stopping activity;
prompting user for decision; and
disconnecting Media Independent Handover.

7. The method according to claim 3, further comprising steps of:
performing system check both before and during rendering to ensure fair and efficient rendering;
allocating one or more of the RANs to network adapters in the mobile device;
attaching the one or more of the RANs to the network and synchronizing when all RANs are connected;
when initialization of 'play/start' is received:
rendering appropriate media on each active area;
parsing a script having one or more next steps describing a rendering of network quality;
performing one or more of the next steps in the script;
stopping activity; and
prompting user for decision.

8. The method according to claim 7, further comprising steps of:
notifying user of constraints; and
ending in accordance with the constraints.

9. The method according to claim 3, further comprising steps of:
performing system check both before and during rendering to ensure fair and efficient rendering;
allocating one or more RANs to network adapters in the mobile device;
attaching the one or more RANs to the network and synchronizing when all RANs are connected;
when initialization of 'play/start' is received:
rendering appropriate media on each active area;
allowing interaction and emulating interaction on all active areas;
stopping activity; and
prompting user for decision.

10. The method according to claim 9, further comprising steps of:
notifying user of constraints; and
ending in accordance with the constraints.

11. The method according to claim 9, further comprising directing user attention to correct aspect.

12. A non-transitory computer readable storage medium storing a program of instructions executable by a machine to perform a method for improving quality-of-experience of using a mobile device, comprising steps of:
storing information relating to radio access networks (RANs) of one or more service providers and quality-of-experience ratings;
receiving an event relating to the RANs of the one of the service providers;
receiving requests for quality-of-experience metrics based on the event;
parsing and interpreting results of the quality-of-experience metrics to obtain the quality-of-experience;
preparing and beginning an emulation session of one or more of the RANs;
choosing a presentation style;
rendering the quality-of-experience in accordance with the chosen presentation style, wherein the chosen presentation style is one of purely quantitative comparison, pre-recorded session, limited interaction-emulated session, live interactive session and live automatically-controlled non-interactive session; and
enabling user input based on the emulation.

13. The non-transitory computer readable storage medium according to claim 12, further comprising the steps of:
standardizing information to allow comparison of the information;
rendering network-related information on a display of the mobile device; and
updating the presentation of the network-related information to maintain a fair representation of the one or more RANs being emulated.

14. The non-transitory computer readable storage medium according to claim 12, further comprising the steps of:
performing system check both before and during rendering to ensure fair and efficient rendering;
rendering an initial view into an active area on the mobile device;
beginning rendering non-initial views in response to "play/start" button;
toggling between tabs and virtual windows views in the active area; and
interacting with toolbar buttons.

15. The non-transitory computer readable storage medium according to claim 12, further comprising steps of:
performing system check both before and during rendering to ensure fair and efficient rendering;
allowing pre-provisioned interaction;
stopping activity;
prompting user for decision; and
disconnecting Media Independent Handover.

16. The non-transitory computer readable storage medium according to claim 12, further comprising steps of:
performing system check both before and during rendering to ensure fair and efficient rendering;
allocating one or more RANs to network adapters in the mobile device;
attaching the one or more RANs to the network and synchronizing when all RANs are connected;
when initialization of 'play/start' is received:
rendering appropriate media on each active area;
parsing an script having one or more next steps in a rendering of network quality;
performing one or more of the next steps in the script;
stopping activity; and
prompting user for decision.

17. The non-transitory computer readable storage medium according to claim 16, further comprising steps of:
notifying user of constraints; and
ending in accordance with the constraints.

18. The non-transitory computer readable storage medium according to claim 12, further comprising steps of:
performing system check to ensure quality rendering;
allocating one or more RANs to network adapters in the mobile device;
attaching the one or more RANs to the network and synchronizing when all RANs are connected;
when initialization of 'play/start' is received:
rendering appropriate media on each active area;
allowing interaction and emulating interaction on all active areas;
stopping activity; and
prompting user for decision.

19. The non-transitory computer readable storage medium according to claim 18, further comprising steps of:
notifying user of constraints; and
ending in accordance with the constraints.

20. The non-transitory computer readable storage medium according to claim 18, further comprising directing user attention to correct aspect.

21. A system for improving quality-of-experience of using a mobile device, comprising:
   a CPU in the mobile device;
   a web browser connector;
   a module operable to track Web browser actions made by a user and to examine and score Web pages and quality measures of nearby wireless networks and to suggest a network as best of the nearby wireless networks based on the Web browser actions;
   a dialog manager interacting with the user via dialogs on the mobile device and capturing input from the mobile device;
   a preference manager storing user preferences for wireless networks as related to Web content; and
   a handover function triggering or executing network handover on demand.

22. The system according to claim 21, wherein the module is further operable to catch a subset of Web browser actions as they happen and pause content loading, to examine current and future Web content of interest to the user, to determine the best nearby wireless network at a given time, to engage the user in a dialog about options regarding the best nearby wireless network, to trigger the network handover, and to proceed to a desired Web resource.

23. A method for improving quality-of-experience of using a mobile device, comprising steps of
   catching, using a CPU in the mobile device, Web browser actions made by a user;
   examining and scoring Web pages and quality measures of nearby wireless networks and to suggest a network as best of the nearby wireless networks based on the Web browser actions;
   interacting with the user via dialogs on the mobile device and capturing input from the mobile device;
   storing user preferences for wireless networks as related to Web content; and
   triggering or executing network handover on demand.

24. The method according to claim 23, further comprising steps of:
   catching Web browser actions at a low level and pausing content loading;
   examining current and future Web content of interest to the user;
   determining the best nearby wireless network at present;
   engaging the user in a dialog about options regarding the nearby wireless networks;
   triggering the network handover; and
   proceeding to a desired Web resource.

* * * * *